US011661018B2

(12) United States Patent
Takeda et al.

(10) Patent No.: US 11,661,018 B2
(45) Date of Patent: May 30, 2023

(54) BRACKET AND ONBOARD DEVICE ATTACHMENT STRUCTURE

(71) Applicant: Nifco Inc., Yokosuka (JP)

(72) Inventors: Naoya Takeda, Yokosuka (JP); Mitsuru Fukumoto, Yokosuka (JP); Satoshi Hasegawa, Tokyo (JP)

(73) Assignee: Nifco Inc., Yokosuka (JP)

( * ) Notice: Subject to any disclaimer, the term of this patent is extended or adjusted under 35 U.S.C. 154(b) by 0 days.

(21) Appl. No.: 17/117,170

(22) Filed: Dec. 10, 2020

(65) Prior Publication Data
US 2021/0178985 A1 Jun. 17, 2021

(30) Foreign Application Priority Data

Dec. 11, 2019 (JP) .............................. JP2019-224036

(51) Int. Cl.
*B60R 11/00* (2006.01)
*B60R 11/04* (2006.01)

(52) U.S. Cl.
CPC .............. *B60R 11/04* (2013.01); *B60R 11/00* (2013.01); *B60R 2011/0026* (2013.01); *B60R 2011/0071* (2013.01)

(58) Field of Classification Search
CPC ..... B60R 2011/0026; B60R 2011/0071; B60R 2011/0005; B60R 2011/0003; B60R 2011/004; B60R 2011/0049; B60R 2011/0082; B60R 2011/0087; B60R 2011/0089; B60R 2011/008; B60R 2011/0084; B60R 2011/0085; G03B 17/561

USPC ...................... 248/205.1, 27.1, 27.3
See application file for complete search history.

(56) References Cited

U.S. PATENT DOCUMENTS

| 5,950,844 A * | 9/1999 | Taylor ..................... B63B 32/83 |
| | | D6/552 |
| 10,081,310 B2 * | 9/2018 | Kasai ................... G03B 17/561 |
| 10,173,608 B2 * | 1/2019 | Kasai ................... H04N 5/2252 |
| 10,220,799 B2 * | 3/2019 | Kasai ..................... B60R 11/04 |
| 10,293,760 B2 * | 5/2019 | Matori .................... B60R 11/04 |
| 10,471,906 B2 * | 11/2019 | Kasai ..................... B60R 11/04 |
| 10,556,551 B2 * | 2/2020 | Krug .................... H04N 5/2252 |
| 10,556,553 B2 * | 2/2020 | Kasarla .................. B60R 11/04 |

(Continued)

FOREIGN PATENT DOCUMENTS

| DE | 10211444 | 10/2003 |
| DE | 102012021571 | 5/2014 |
| JP | 2017-171167 | 9/2017 |

OTHER PUBLICATIONS

Prüfungsantrag [Request for Examination] dated Apr. 4, 2022 From the Deutsches Patent-und Markenamt [German Patent and Trademark Office] Re. Application No. 10 2020 133 134.7 and its Translation into English (9 Pages).

*Primary Examiner* — Nkeisha Smith

(57) ABSTRACT

A resin bracket for fixing an onboard device to a window glass employed in a vehicle. The bracket includes plural bracket pieces, each configured to be adhered to the window glass, a coupling portion configured to couple together adjacent bracket pieces of the bracket pieces so as to allow relative movement therebetween, and an engaging portion provided at each of the bracket pieces so as to enable plural engagement portions provided at the onboard device to engage with the respective engaging portions.

8 Claims, 19 Drawing Sheets

(56) References Cited

U.S. PATENT DOCUMENTS

| | | | | |
|---|---|---|---|---|
| 10,676,040 B2* | 6/2020 | Naoi | .................. | B60R 11/04 |
| 10,680,421 B2* | 6/2020 | Ruebel | .............. | B60R 16/0215 |
| 10,800,343 B2* | 10/2020 | Kasai | .................. | B60R 11/04 |
| 10,870,401 B2* | 12/2020 | Kataishi | ............... | G03B 19/07 |
| 10,921,166 B2* | 2/2021 | Matori | ................ | B60R 11/04 |
| 10,953,815 B2* | 3/2021 | Edgarian | ............... | B60R 11/04 |
| 11,040,671 B2* | 6/2021 | Yamamoto | ........... | H04N 5/2257 |
| 11,148,610 B2* | 10/2021 | Ohsumi | ............... | B60R 11/04 |
| 11,237,029 B2* | 2/2022 | Kasai | .................. | G01D 11/245 |
| 11,237,461 B2* | 2/2022 | Kasai | .................. | B60R 11/04 |
| 2015/0314735 A1 | 11/2015 | Krug et al. | | |
| 2016/0348833 A1* | 12/2016 | Peterson | ............. | F16M 13/022 |
| 2019/0193649 A1* | 6/2019 | Kataishi | ............... | H04N 5/225 |
| 2019/0248301 A1* | 8/2019 | Edgarian | ............. | H04N 5/2252 |
| 2019/0387878 A1* | 12/2019 | Gaviria | ................ | A47B 81/00 |
| 2021/0031704 A1* | 2/2021 | Lamoureux | .............. | B60J 1/02 |
| 2021/0284082 A1* | 9/2021 | Tokito | ................. | H04N 5/225 |
| 2022/0041118 A1* | 2/2022 | Lindsay-Neale | .... | G03B 17/561 |

\* cited by examiner

BRACKET AND ONBOARD DEVICE ATTACHMENT STRUCTURE

RELATED APPLICATION

This application claims the benefit of priority of Japanese Patent Application No. 2019-224036 filed on Dec. 11, 2019, the contents of which are incorporated herein by reference in their entirety.

FIELD AND BACKGROUND OF THE INVENTION

The present disclosure relates to a bracket and an onboard device attachment structure.

Japanese Patent Application Laid-Open (JP-A) No. 2017-171167 discloses a structure in which a camera serving as an onboard device is attached to a resin camera bracket adhered to front glass, such that the camera is fixed to the front glass through the bracket. The bracket is provided with plural engaging portions that respectively engage with plural engagement portions of the camera, and an adhesion face for adhesion to the front glass.

In cases in which the onboard device is a large camera such as a stereo camera, the size of the bracket to be adhered to the front glass needs to be increased in line with the size of the camera. However, when the size of such a resin bracket is increased, the degree of expansion of the bracket accompanying a rise in the temperature of the camera (in other words, a thermal expansion amount) also increases, causing a larger shear force to act on the adhesive that adheres the bracket to the front glass. When a large shear force acts on the adhesive in this manner, the adhesive might fail to function as intended, reducing the adhesive strength between the bracket and the front glass. Note that employing the bracket disclosed in JP-A No. 2017-171167 could lead to such a reduction in the adhesive strength between the bracket and the front glass.

SUMMARY OF THE INVENTION

In consideration of the above circumstances, an object of the present disclosure is to provide a resin bracket for adhesion to window glass employed in a vehicle and an onboard device attachment structure employing the bracket, the bracket and the onboard device attachment structure being configured to suppress a reduction in adhesive strength between the bracket and the window glass accompanying an increase in temperature.

A bracket of a first aspect of the present disclosure is a resin bracket for fixing an onboard device to a window glass employed in a vehicle. The bracket includes plural bracket pieces, each configured to be adhered to the window glass, a coupling portion configured to couple together adjacent bracket pieces of the bracket pieces so as to allow relative movement therebetween, and an engaging portion provided at the each of the bracket pieces so as to enable plural engagement portions provided at the onboard device to engage with the respective engaging portions.

In the bracket of the first aspect, the plural bracket pieces are adhered to the window glass, and the plural engagement portions of the onboard device engage with the engaging portions of the respective bracket pieces so as to fix the onboard device to the window glass through the plural bracket pieces (through the bracket).

In this bracket, since the adjacent bracket pieces of the bracket pieces are coupled together by the coupling portions so as to allow relative movement therebetween, even if the respective bracket pieces undergo thermal expansion accompanying an increase in the temperature of the onboard device, such thermal expansion of the adjacent bracket pieces is absorbed by the coupling portions. Since the bracket includes such a configuration to absorb thermal expansion accompanying an increase in temperature, an increase in shear force acting on an adhesive between the bracket and the window glass due to this thermal expansion can be suppressed. The bracket is thus capable of suppressing a reduction in adhesive strength between the bracket and the window glass accompanying thermal expansion.

A bracket of a second aspect of the present disclosure is the bracket of the first aspect, wherein the coupling portion includes a deformable portion capable of elastic deformation.

In the bracket of the second aspect, the coupling portion includes the deformable portion that is capable of elastic deformation, and this deformable portion undergoes elastic deformation so as to absorb thermal expansion of the adjacent bracket pieces. The bracket is thus capable of suppressing a reduction in adhesive strength between the bracket and the window glass accompanying thermal expansion by a simple configuration in which the deformable portions undergo elastic deformation.

A bracket of a third aspect of the present disclosure is the bracket of the second aspect, wherein the deformable portion is a curved portion capable of bending deformation.

In the bracket of the third aspect, the deformable portion of the bracket is configured by the curved portion that is capable of bending deformation, thereby enabling a localized concentration of stress to be suppressed from arising in the curved portion during bending deformation (elastic deformation) of the curved portion. The bracket is thus capable of maintaining the advantageous effect of absorbing thermal expansion of the adjacent bracket pieces in the coupling portion over a long period of time.

A bracket of a fourth aspect of the present disclosure is the bracket of the second aspect or the third aspect, wherein a thickness of the deformable portion is smaller than a thickness of the bracket pieces.

In the bracket of the fourth aspect, the thickness of the deformable portion is smaller than the thickness of the bracket pieces. The deformable portion therefore undergoes elastic deformation more readily than it would in cases in which, for example, the thickness of the deformable portion were equivalent to or greater than the thickness of the bracket piece. This enables the deformable portion of the bracket to be made to undergo elastic deformation more readily by using a simple configuration in which the thickness of the deformable portion is smaller than the thickness of the bracket pieces.

A bracket of a fifth aspect of the present disclosure is the bracket of any one of the first aspect to the fourth aspect, wherein adjacent bracket pieces of the bracket pieces are coupled together by plural of the coupling portions.

In the bracket of the fifth aspect, the adjacent bracket pieces of the bracket pieces are coupled together by plural of the coupling portions. This enables absorption of the thermal expansion of the adjacent bracket pieces of the bracket pieces to be spread between the plural coupling portions, in contrast to in configurations in which, for example, adjacent bracket pieces are coupled together by a single coupling portion. This enables thermal expansion of the adjacent bracket pieces to be stably absorbed.

A bracket of a sixth aspect of the present disclosure is the bracket of any one of the first aspect to the fourth aspect, wherein adjacent bracket pieces of the bracket pieces are coupled together by plural of the coupling portions, which have the same shape as each other, and adjacent coupling portions of the coupling portions are disposed symmetrically with each other.

In the bracket of the sixth aspect, the adjacent bracket pieces are coupled together by the plural coupling portions that have the same shape as each other, and the adjacent coupling portions of the coupling portions are disposed symmetrically with each other. This enables thermal expansion of the adjacent bracket pieces of the bracket pieces to be absorbed substantially uniformly by the respective coupling portions. This enables thermal expansion of the adjacent bracket pieces to be still more stably absorbed.

An onboard device attachment structure of a seventh aspect of the present disclosure includes the bracket of any one of the first aspect to the sixth aspect adhered to window glass employed in a vehicle, and an onboard device that is provided with an engagement portion configured to engage with the engaging portion of the bracket, and that is attachable to the bracket.

In the onboard device attachment structure of the seventh aspect, the plural bracket pieces are adhered to the window glass, and the plural engagement portions of the onboard device engage with the engaging portions of the respective bracket pieces so as to fix the onboard device to the window glass through the plural bracket pieces (through the bracket).

Since the adjacent bracket pieces of the bracket pieces of this onboard device attachment structure are coupled together by the coupling portions so as to allow relative movement therebetween, even if the respective bracket pieces undergo thermal expansion accompanying an increase in the temperature of the onboard device, such thermal expansion of the adjacent bracket pieces is absorbed by the coupling portions. Since the bracket includes such a configuration to absorb thermal expansion accompanying an increase in temperature, an increase in shear force acting on an adhesive between the bracket and the window glass due to this thermal expansion can be suppressed. The onboard device attachment structure is thus capable of suppressing a reduction in adhesive strength between the bracket and the window glass accompanying an increase in the temperature of the onboard device.

An onboard device attachment structure of an eighth aspect of the present disclosure is the onboard device attachment structure of the seventh aspect, wherein the onboard device comprises a stereo camera configured to image an area ahead of the vehicle, the plural bracket pieces included in the bracket are adhered to the front glass of the vehicle in a state arrayed along a vehicle width direction, and plural of the engagement portions provided at the stereo camera are configured to engage with the engaging portions provided at the respective bracket pieces.

In the stereo camera configuring the onboard device employed for driving assistance by imaging the area ahead of the vehicle, two cameras are disposed at discrete locations in a length direction. When fixing such a stereo camera to the front glass, the stereo camera needs to be fixed with respect to the front glass such that the length direction of the stereo camera is aligned with the vehicle width direction (in other words, such that the two cameras are spaced apart from each other in the vehicle width direction).

Note that in the onboard device attachment structure of the eighth aspect, the plural bracket pieces are adhered to the front glass in a state in which the plural bracket pieces are arrayed along the vehicle width direction. This enables thermal expansion of the adjacent bracket pieces in the vehicle width direction to be better absorbed by the coupling portions than in configurations in which, for example, plural bracket pieces are adhered to the front glass in a state in which the plural bracket pieces are arrayed along the vehicle front-rear direction. Thus, vehicle width direction positioning accuracy of the stereo camera with respect to the front glass when fixed to the front glass through the bracket is improved.

The present disclosure is thus capable of providing a resin bracket for adhesion to window glass employed in a vehicle and an onboard device attachment structure employing the bracket, in which the bracket and the onboard device attachment structure are configured to suppress a reduction in adhesive strength between the bracket and the window glass accompanying an increase in temperature.

BRIEF DESCRIPTION OF THE SEVERAL VIEWS OF THE DRAWINGS

Exemplary embodiments of the present invention will be described in detail based on the following figures, wherein.

DESCRIPTION OF SPECIFIC EMBODIMENTS OF THE INVENTION

Explanation follows regarding a bracket and an onboard device attachment structure employing this bracket according to an exemplary embodiment of the present disclosure, with reference to the drawings.

Figure 1:
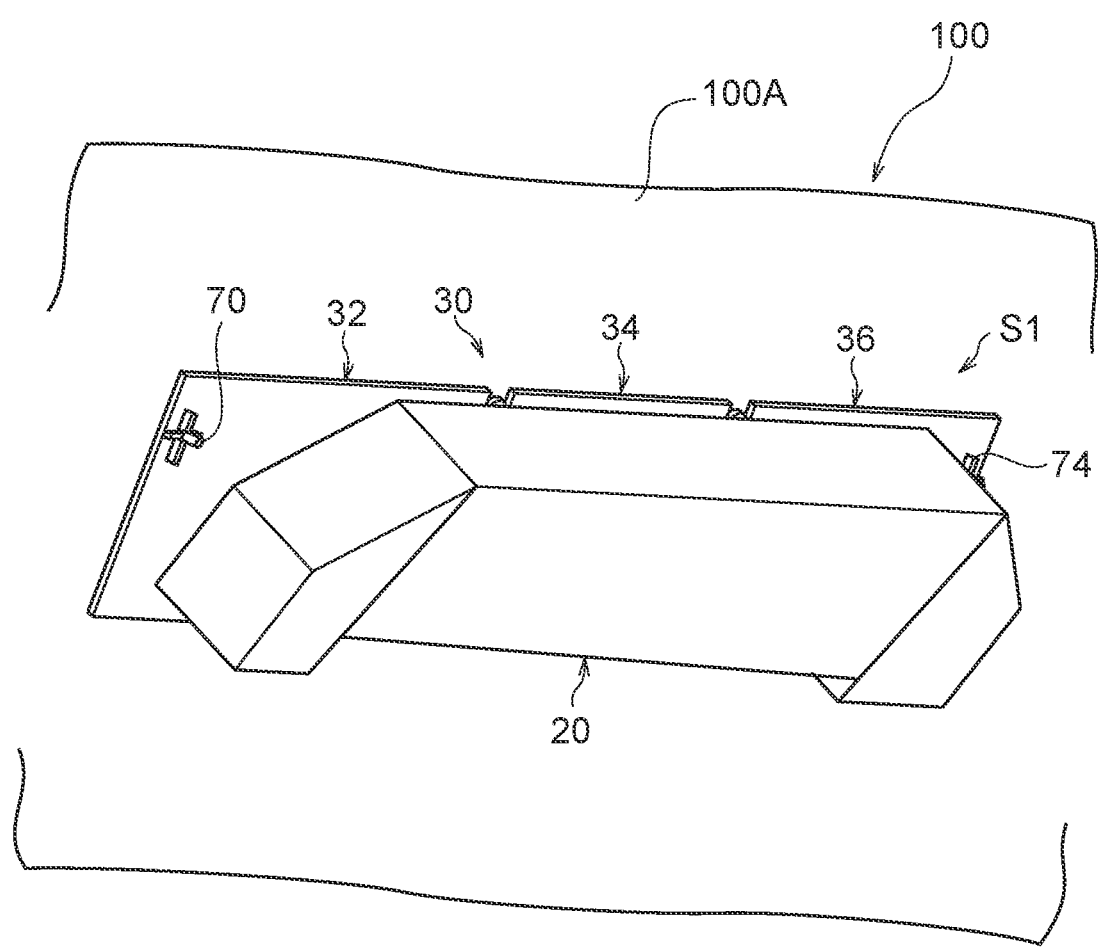
FIG. 1 is a perspective view illustrating an onboard device attachment structure according to an exemplary embodiment of the present disclosure.
Figure 13:
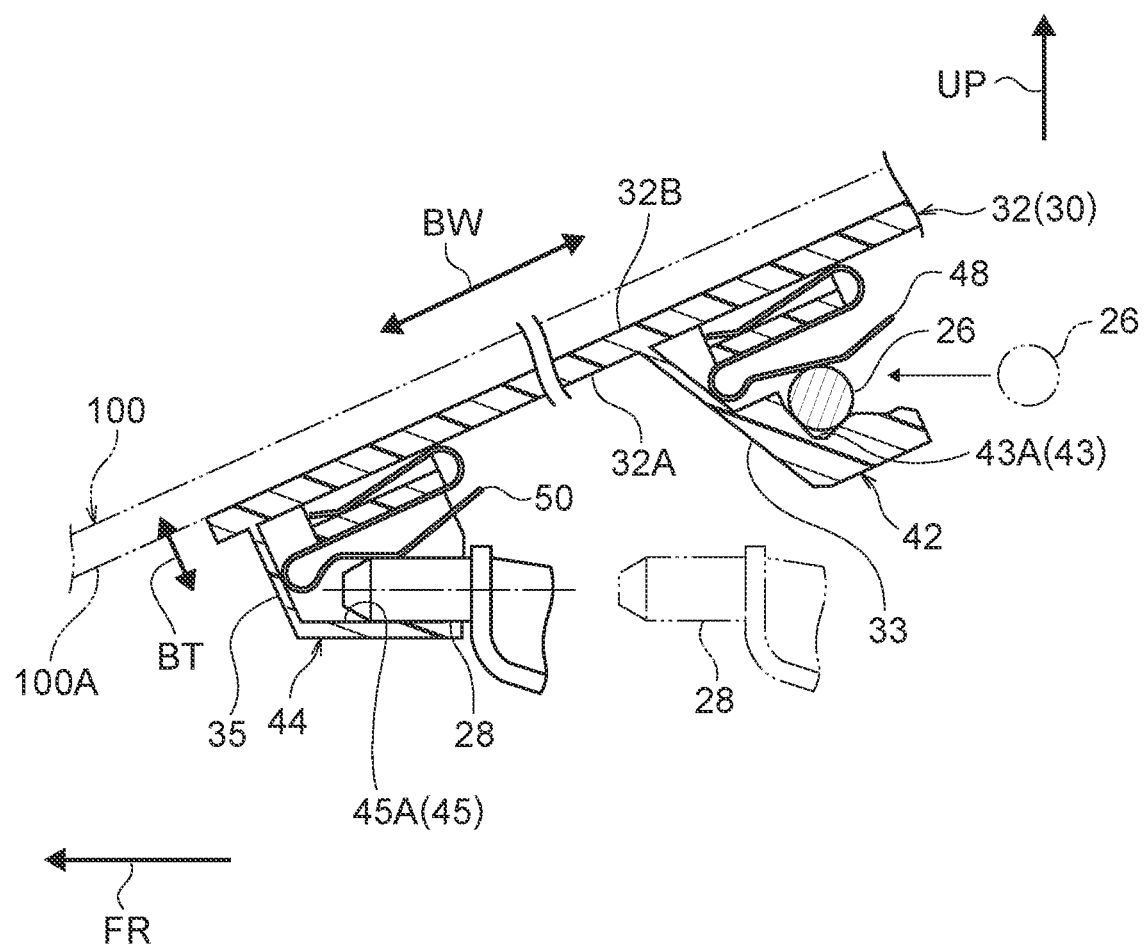
FIG. 13 is a cross-section sectioned along line 13-13 in FIG. 2, illustrating a state in which an onboard device has been attached to a bracket adhered to window glass.

As illustrated in FIG. 1 and FIG. 13, a bracket 30 of the present exemplary embodiment is a member for fixing an onboard device 20 to window glass 100 employed in a vehicle. Note that the bracket 30 will be described in detail later.

An onboard device attachment structure 51 (hereafter referred to as the attachment structure 51 as appropriate) of the present exemplary embodiment is an attachment structure used to attach the onboard device 20 to the bracket 30 provided at the window glass 100. The onboard device 20 and the bracket 30 are included in the attachment structure 51.

Onboard Device

As illustrated in FIG. 1 and FIG. 13, the onboard device 20 is an electronic device that is fixed to the window glass 100 through the bracket 30. In the present exemplary embodiment, a stereo camera that images an area ahead of the vehicle is employed as the onboard device 20. Note that the present disclosure is not limited to this configuration, and various sensors employed in driving assistance (such as a mono camera or LIDAR), a drive recorder, or an antenna for receiving electromagnetic waves (such as a GPS antenna, a radio antenna, or a television antenna) may be employed as the onboard device. Alternatively, a composite unit incorporating any combination of the various sensors, the drive recorder, and the antennae mentioned above may be employed as the onboard device.

The onboard device 20 of the present exemplary embodiment includes housing 22, two cameras 24 attached to the housing 22, and engagement projections 26, 28 provided at the housing 22.

Figure 3:
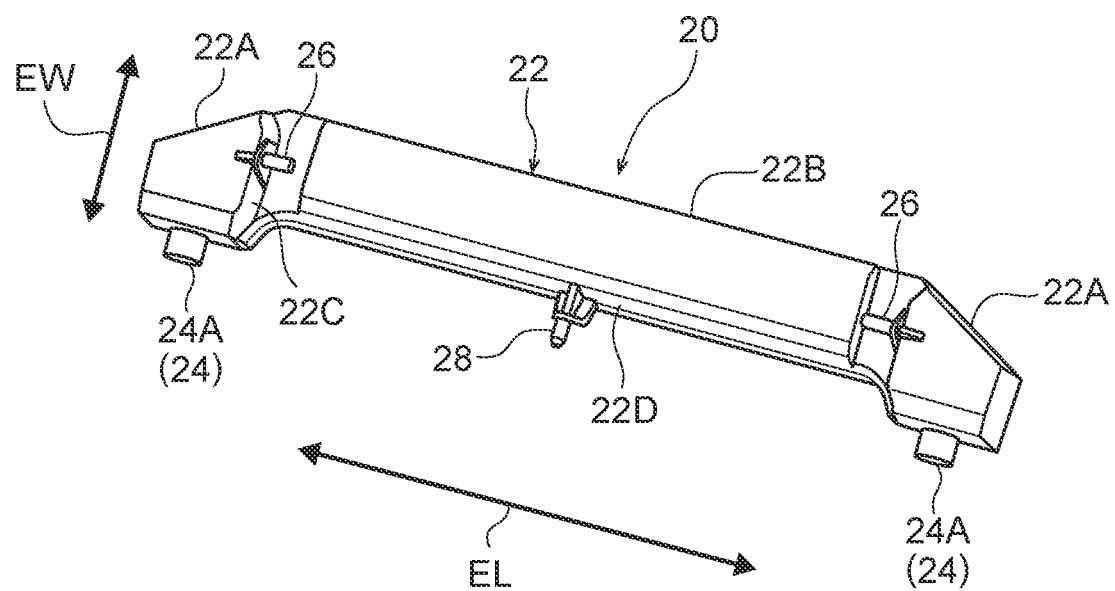
FIG. 3 is a perspective view of an onboard device illustrated in FIG. 1.

The housing 22 is made of resin, and accommodating portions 22A for accommodating the cameras 24 are respectively formed at both length direction end portions of the housing 22 (this length direction corresponding to the arrow EL direction in FIG. 3). The accommodating portions 22A have a greater thickness than a length direction (hereafter referred to as the length direction EL as appropriate) intermediate portion 22B of the housing 22. Lens portions 24A of the respective cameras 24 are exposed through peripheral walls on one side of the accommodating portions 22A in a width direction of the housing 22 (this width direction corresponding to the arrow EW direction in FIG. 3). Wiring for the two cameras 24 is contained inside the housing 22.

The two cameras 24 are disposed at discrete locations in the length direction EL of the housing 22. The respective lens portions 24A face toward the one width direction (hereafter referred to as the width direction EW as appropriate) side of the housing 22. Note that in a state in which the housing 22 has been attached to the bracket 30 provided inside the vehicle cabin, the respective lens portions 24A of the two cameras 24 face ahead of the vehicle.

Engagement Projections

The engagement projections 26, 28 are an example of engagement portions used to attach the housing 22 to the bracket 30.

As illustrated in FIG. 3, the engagement projections 26 are pin shaped projections project along the length direction EL from a peripheral walls 22C at the length direction EL inner sides (in other words, the length direction EL center sides) of the respective accommodating portions 22A. The pair of engagement projections 26 that project from the accommodating portions 22A on both length direction EL sides are provided at the respective accommodating portions 22A so as to run coaxially to each other. In other words, the engagement projections 26 are provided at the accommodating portions 22A such that an axial line of one engagement projection 26 is positioned on an extension line of an axial line of the other engagement projection 26.

As illustrated in FIG. 3, the engagement projection 28 is a pin shaped projection that projects along the width direction EW from a peripheral wall 22D on the one width direction EW side of the intermediate portion 22B of the housing 22.

Bracket

As previously described, the bracket 30 is a member used to fix the onboard device 20 to the window glass 100 employed in a vehicle. Note that in the present exemplary embodiment, the bracket 30 is adhered to front glass, this being an example of the window glass 100.

The bracket 30 is made of resin, and is formed in an elongated plate shape. In the following explanation, the arrow BL indicates a length direction of the bracket 30, the arrow BW indicates a width direction of the bracket 30, and the arrow BT indicates a thickness direction of the bracket 30. In a state in which the onboard device 20 has been attached to the bracket 30, the length direction (hereafter referred to as the length direction BL as appropriate) of the bracket 30 substantially matches (allowing for manufacturing tolerance) the length direction EL of the housing 22, and the width direction (hereafter referred to as the width direction BW as appropriate) of the bracket 30 substantially matches (allowing for manufacturing tolerance) the width direction EW of the housing 22. Furthermore, in a state in which the bracket 30 has been attached to the window glass 100, the length direction BL of the bracket 30 substantially matches a vehicle width direction, and the width direction BW of the bracket 30 substantially matches a vehicle front-rear direction. Note that one width direction BW side of the bracket 30 faces ahead of the vehicle (in the arrow FR direction in FIG. 13). The arrow UP in FIG. 13 indicates a vehicle upper side.

Figure 2:
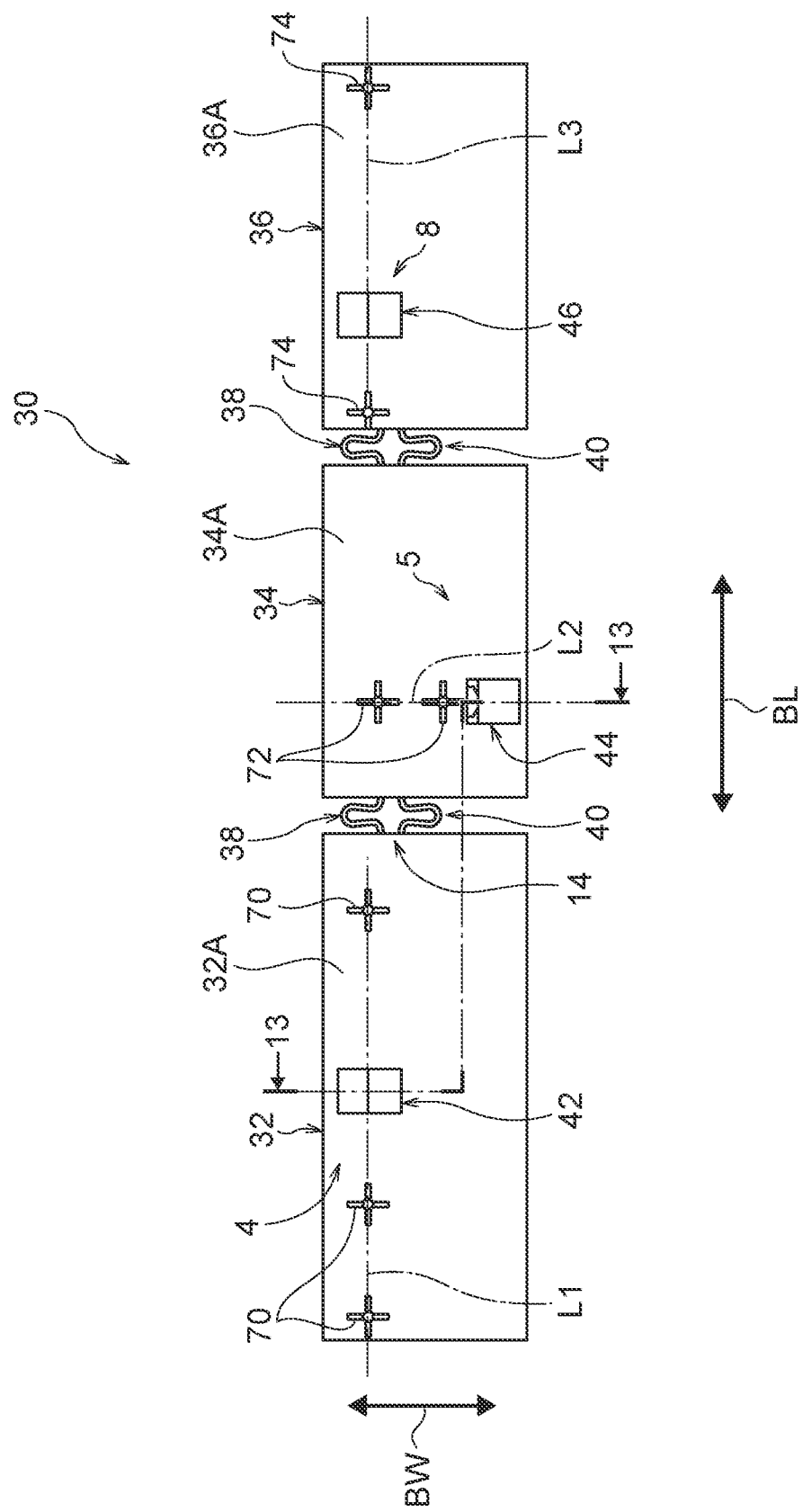
FIG. 2 is a plan view of a bracket illustrated in FIG. 1, as viewed from a front face side.

As illustrated in FIG. 2, the bracket 30 includes bracket pieces 32, 34, 36, coupling portions 38, 40, and engaging portions 42, 44, 46. The bracket 30 also includes positioning portions 70, 72, 74. Note that the bracket pieces 32, 34, 36, the coupling portions 38, 40, the engaging portions 42, 44, 46, and the positioning portions 70, 72, 74 are molded together as an integral unit.

Bracket Pieces

The bracket pieces 32, 34, 36 are locations configured by dividing the body of the bracket 30 along the length direction BL. In other words, the bracket pieces 32, 34, 36 are arrayed along the length direction BL of the bracket 30. In the present exemplary embodiment, the bracket piece 34 is disposed at a length direction BL center of the bracket 30, and the respective bracket pieces 32, 36 are disposed on either length direction BL side of the bracket piece 34.

The bracket pieces 32, 34, 36 are each formed in a plate shape.

An adhesive is applied to respective back faces 32B, 34B, 36B of the bracket pieces 32, 34, 36, and the respective back faces 32B, 34B, 36B are pressed against an inner face (vehicle cabin inside face) 100A of the window glass 100 so as to adhere the bracket pieces 32, 34, 36 to the window glass 100. The adhesive may be applied over the entirety of the back faces, or locally applied to the back faces, of the respective bracket pieces. In the present exemplary embodiment, the adhesive is locally applied to the back faces of the respective bracket pieces (specifically, applied at plural discrete positions).

Coupling Portions

Figure 14A:
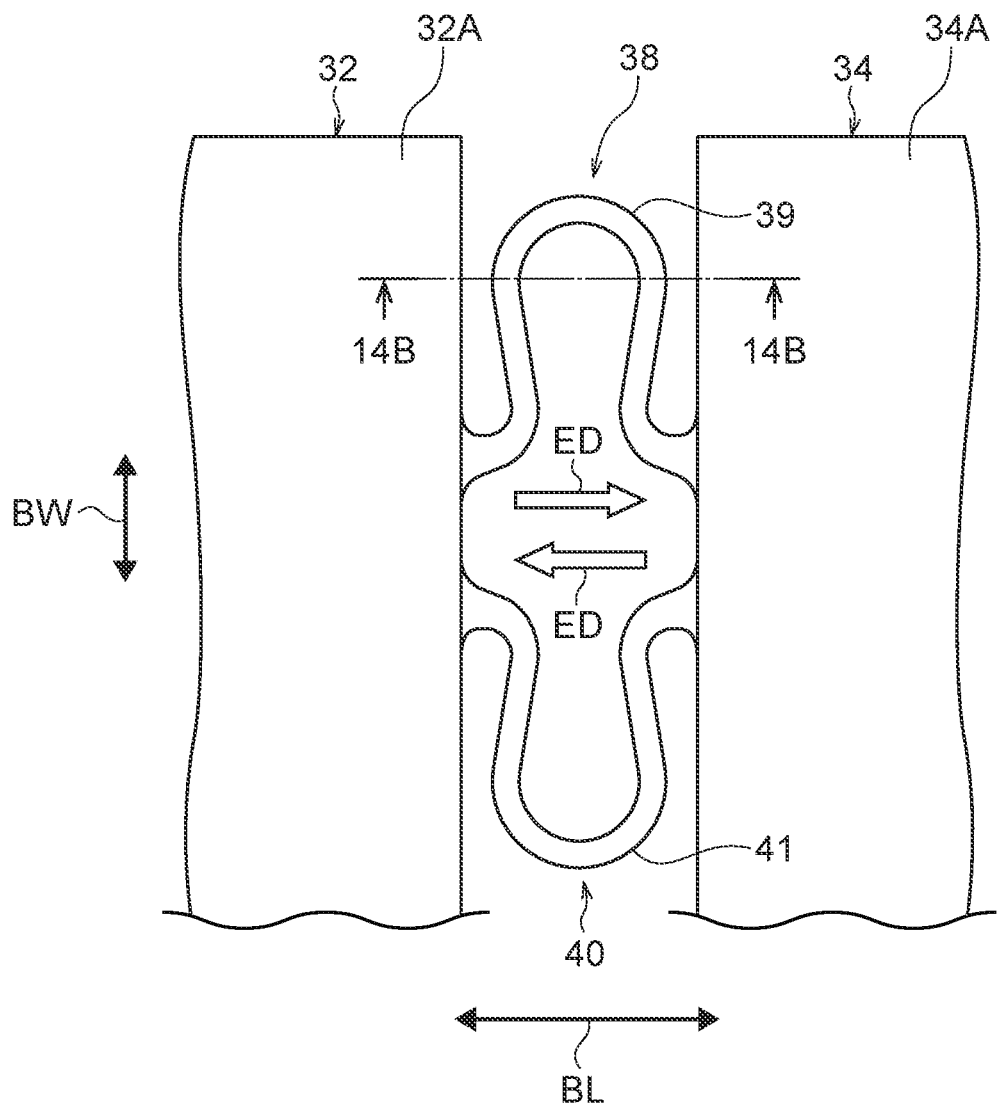
FIG. 14A is an enlarged diagram of the region indicated by the arrow 14 in FIG. 2.
Figure 14B:
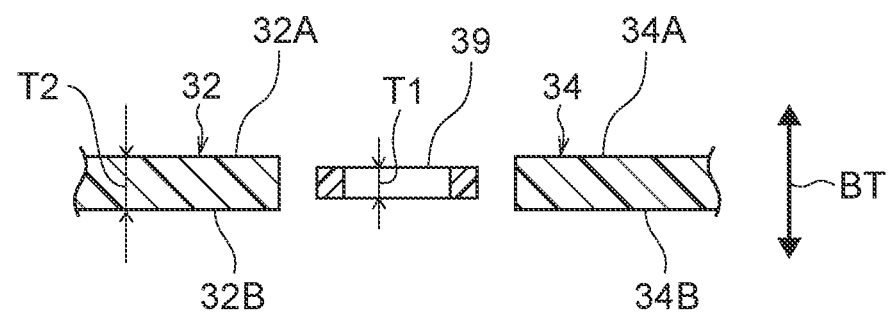
FIG. 14B is a cross-section sectioned along line 14B-14B in FIG. 14A.

As illustrated in FIG. 2, FIG. 14A, and FIG. 14B, the coupling portions 38, 40 are locations coupling the adjacent bracket pieces 32, 34 and the adjacent bracket pieces 34, 36 together so as to allow relative movement therebetween (FIG. 14A and FIG. 14B illustrate the coupling portions 38, 40 that couple the adjacent bracket pieces 32, 34 together). Namely, the adjacent bracket pieces 32, 34 are coupled together by one of each of the coupling portions 38, 40, and the adjacent bracket pieces 34, 36 are coupled together by one of each of the coupling portions 38, 40.

Each of the coupling portions 38 includes a deformable portion 39 that is capable of elastic deformation. The deformable portion 39 is a curved portion that is capable of bending deformation. Specifically, the coupling portion 38 of the present exemplary embodiment is a strip shaped location that extends from one to another of the bracket pieces. An extension direction central portion of the coupling portion 38 is curved so as to arch toward the other width direction BW side. This curved portion is the location that is capable of bending deformation, and configures the deformable portion 39 of the coupling portion 38. Note that as long as the deformable portion 39 is capable of bending deformation, there is no limitation to this curved shape. For example, the deformable portion 39 may be a curved portion that curves in a circular arc shape toward the other width direction BW side, or may be a curved portion that curves in a U shape toward the other width direction BW side.

A thickness T1 of the deformable portion 39 is smaller than a thickness T2 of the bracket piece 32. Note that the thickness T2 of the bracket piece 32 refers to the thickness of the bracket piece 32 near to a location coupled to the coupling portion 38. In the present exemplary embodiment, the bracket pieces 34, 36 each have the same thickness as the thickness T2 of the bracket piece 32.

Each of the coupling portions 40 includes a deformable portion 41 that is capable of elastic deformation. The deformable portion 41 is a curved portion that is capable of bending deformation. Specifically, the coupling portion 40 of the present exemplary embodiment is a strip shaped location that extends from one to another of the bracket pieces. An extension direction central portion of the coupling portion 40 is curved so as to arch toward the one width direction BW side. This curved portion is the location that is capable of bending deformation, and configures the deformable portion 41 of the coupling portion 40. Note that as long as the deformable portion 41 is capable of bending deformation, there is no limitation to this curved shape. For example, the deformable portion 41 may be a curved portion that curves in a circular arc shape toward the one width direction BW side, or may be a curved portion that curves in a U shape toward the one width direction BW side.

In the present exemplary embodiment, a thickness of the deformable portion 41 is the same as the thickness of the deformable portion 39. The thickness of the deformable portion 41 is therefore less than the thickness T2 of the bracket piece 32.

In the present exemplary embodiment, the two coupling portions 38, 40 have the same shape as each other, and adjacent coupling portions 38, 40 are disposed with symmetry to one another. Specifically, coupling portions 38, 40 that oppose each other between adjacent bracket pieces 32, 34 together bracket pieces are disposed with symmetry to each other in the width direction BW of the bracket 30.

Engaging Portions

The engaging portions 42, 46 are locations with which the pair of engagement projections 26 of the onboard device 20 respectively engage, and the engaging portion 44 is a location with which the engagement projection 28 of the onboard device 20 engages. The engaging portion 42 is provided at the bracket piece 32, the engaging portion 44 is provided at the bracket piece 34, and the engaging portion 46 is provided at the bracket piece 36.

Figure 4:
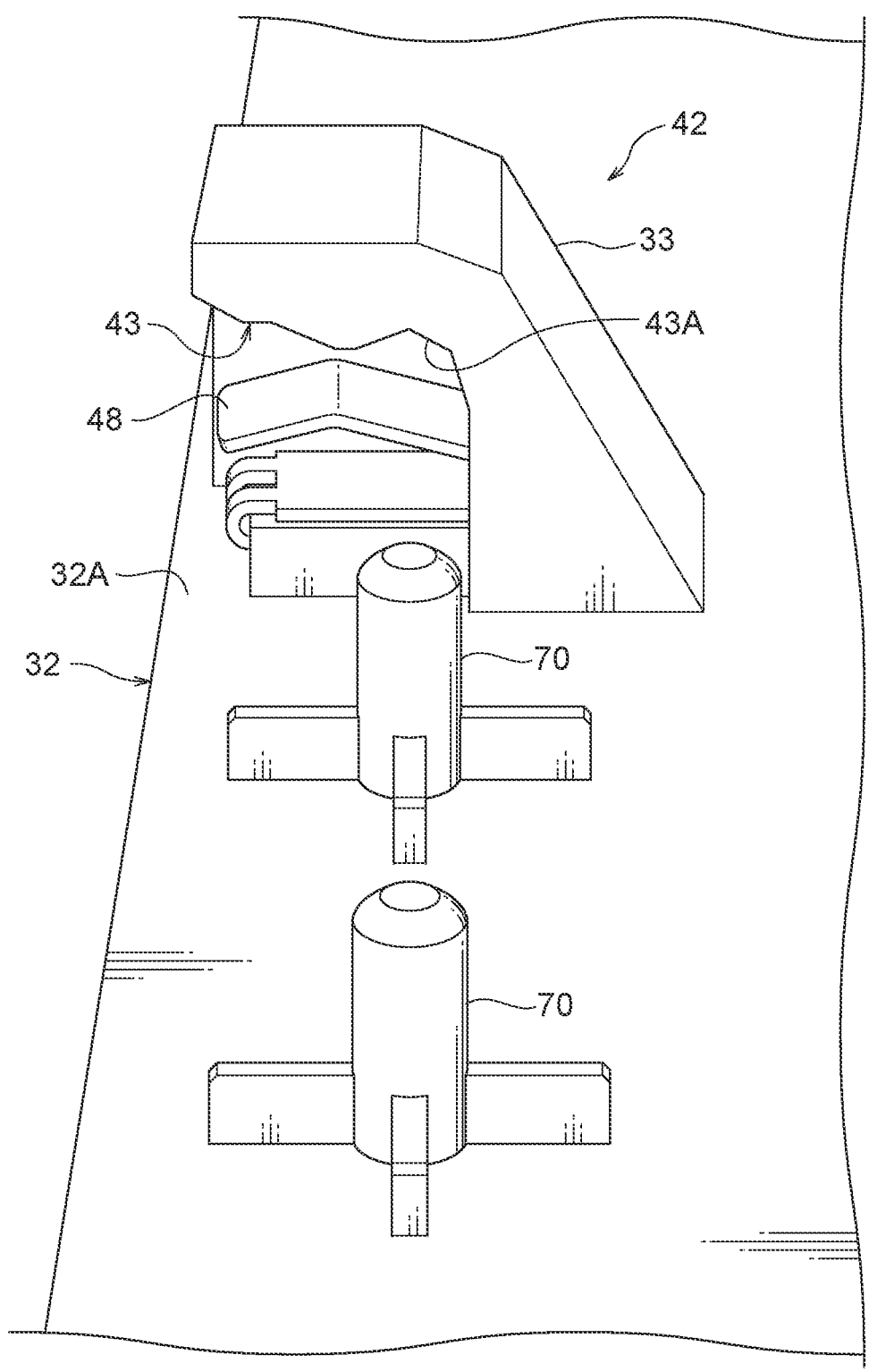
FIG. 4 is an enlarged perspective view of the region indicated by the arrow 4 in FIG. 2.
Figure 6:
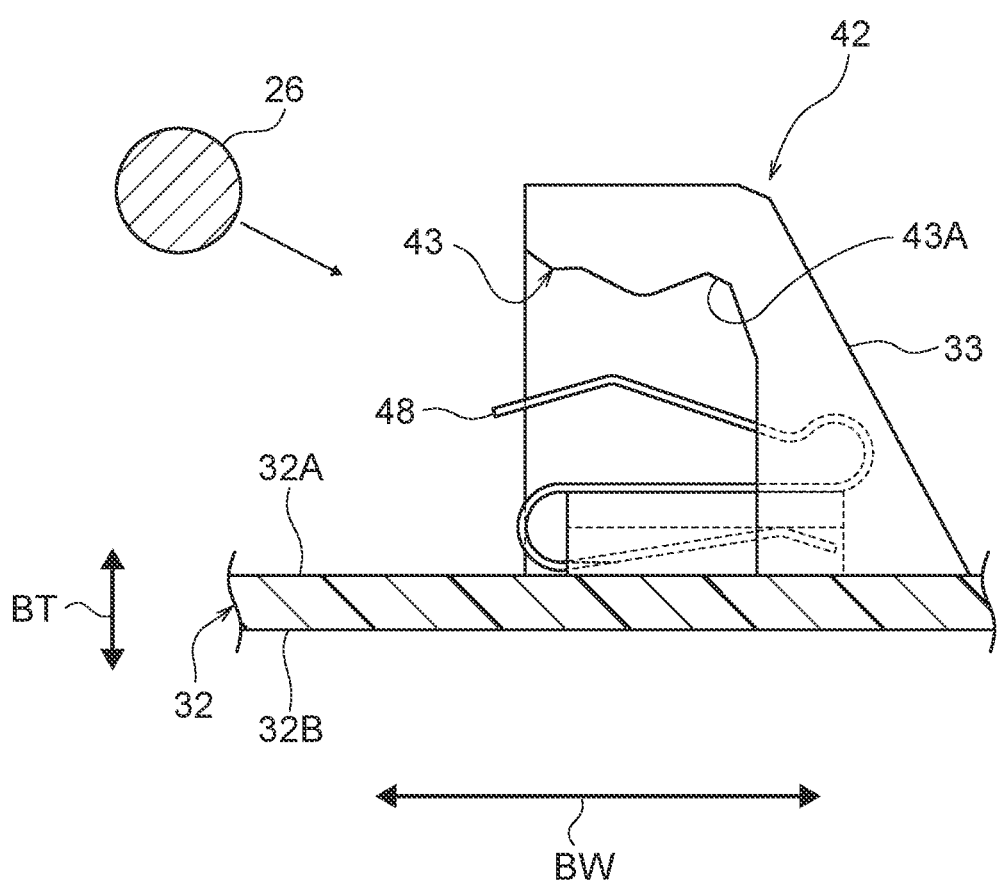
FIG. 6 is a side view of the region indicated by the arrow 4 in FIG. 2, as viewed from a length direction outer side of the bracket.

As illustrated in FIG. 4 and FIG. 6, the engaging portion 42 includes a protruding portion 33 provided at the bracket piece 32, a guide recess portion 43 provided at the protruding portion 33, and a biasing member 48 provided in the guide recess portion 43. The protruding portion 33 is a portion that protrudes from a front face 32A of the bracket piece 32, and is provided with the guide recess portion 43 that is recessed toward the one width direction BW side. A wall face on the other width direction BW side and a wall face on a length direction BL outer side of the protruding portion 33 have openings at the guide recess portion 43. During attachment of the onboard device 20 to the bracket 30, one of the engagement projections 26 is inserted into the guide recess portion 43. An engager recess portion 43A is formed on a recess bottom side (in other words, the one width direction BW side) of the guide recess portion 43. The one engagement projection 26 is fitted into the engager recess portion 43A from a direction orthogonal to the projection direction of the engagement projection 26. The biasing member 48 is a plate shaped member that biases the one engagement projection 26 that has been fitted into the engager recess portion 43A toward the engager recess portion 43A, and a plate spring is employed therefor in the present exemplary embodiment. Specifically, the biasing member 48 biases the one engagement projection 26 that has been fitted into the engager recess portion 43A toward a bottom side of the engager recess portion 43A from a opposite side to the side where the one engagement projection 26 is fitted. The one engagement projection 26 that has been fitted into the engager recess portion 43A is thereby maintained in a fitted state in the engager recess portion 43A by the biasing force of the biasing member 48. Namely, the one engagement projection 26 is maintained in an engaged state with the engaging portion 42.

Figure 5:
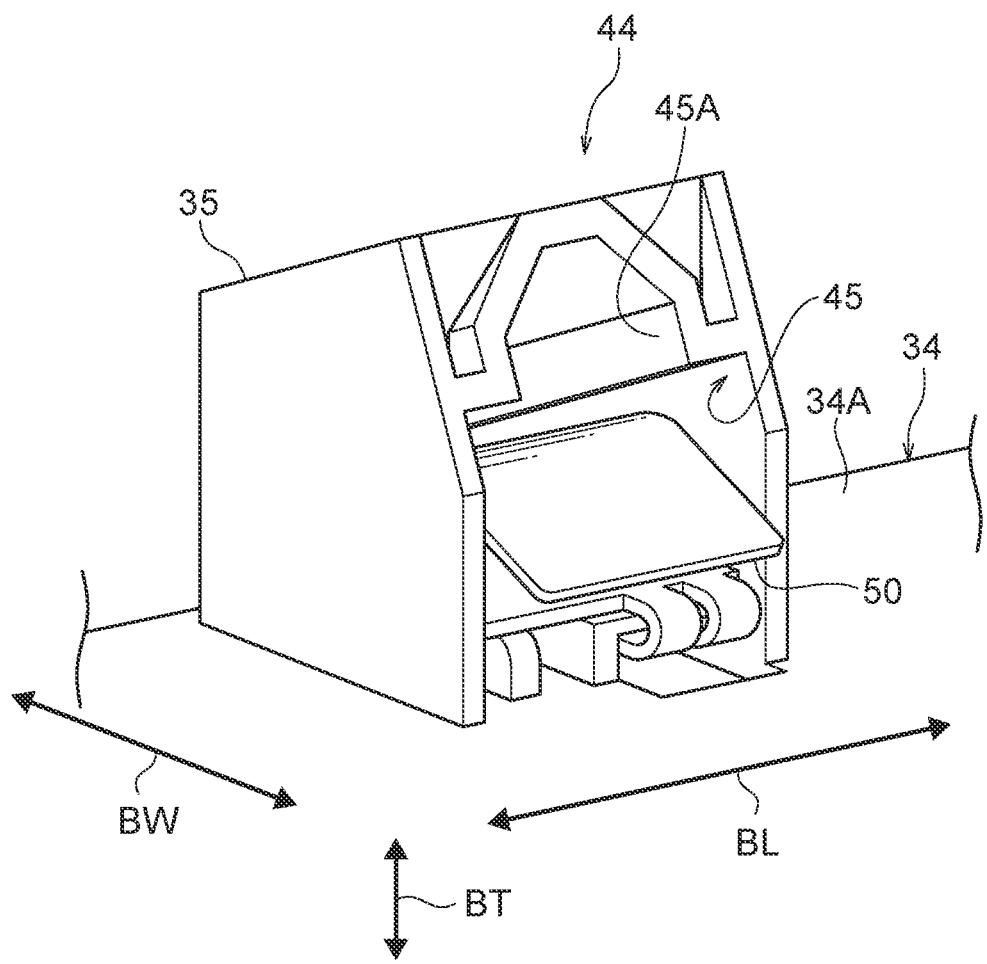
FIG. 5 is an enlarged perspective view of the region indicated by the arrow 5 in FIG. 2.
Figure 10:
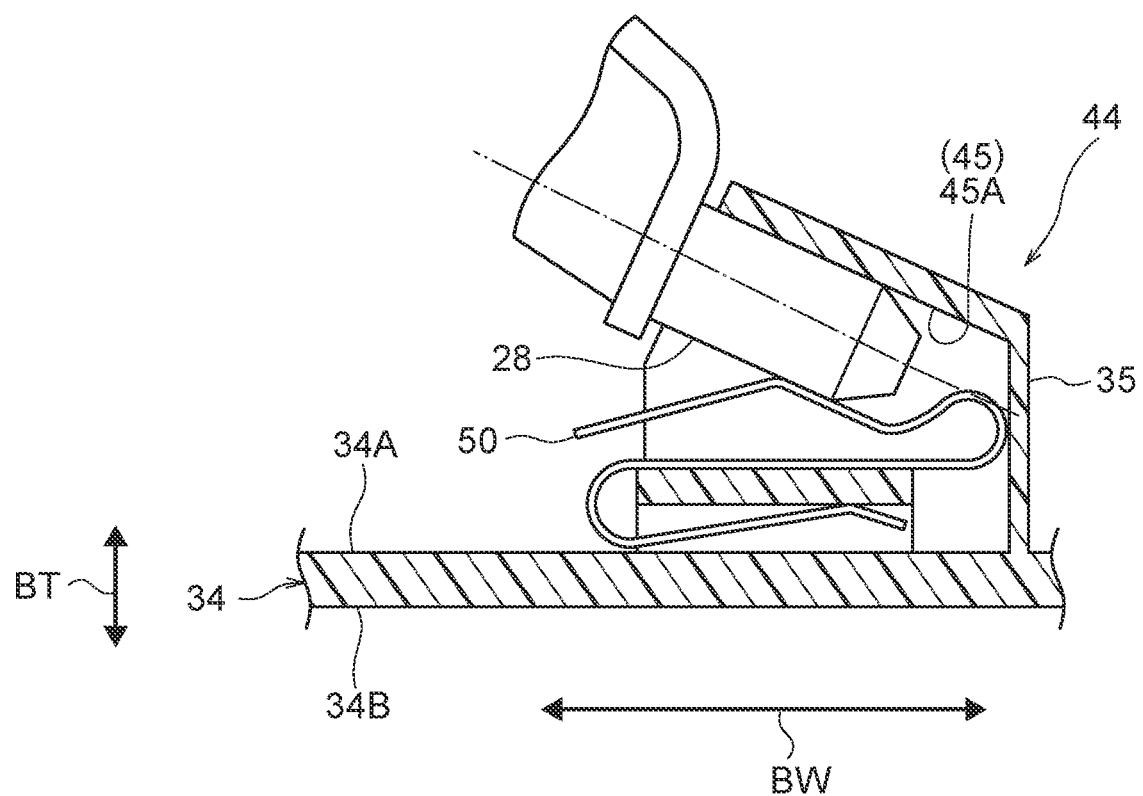
FIG. 10 is a cross-section of an engaging portion illustrated in FIG. 5, as sectioned along a width direction of the bracket.

As illustrated in FIG. 5 and FIG. 10, the engaging portion 44 includes a protruding portion 35 provided at the bracket piece 34, a guide recess portion 45 provided at the protruding portion 35, and a biasing member 50 provided at the guide recess portion 45. The protruding portion 35 is a portion that protrudes from a front face 34A of the bracket piece 34, and is provided with the guide recess portion 45 that is recessed toward the one width direction BW side. A wall face on the other width direction BW side of the protruding portion 35 has an opening at the guide recess portion 45. During attachment of the onboard device 20 to the bracket 30, the engagement projection 28 is inserted into the guide recess portion 45. An engager recess portion 45A is formed on a recess wall face on the opposite side of the guide recess portion 45 to the front face 34A. The engagement projection 28 is fitted into the engager recess portion 45A along the projection direction of the engagement projection 28. The biasing member 50 is a plate shaped member that biases the engagement projection 28 that has been fitted into the engager recess portion 45A toward the engager recess portion 45A, and a plate spring is employed therefor in the present exemplary embodiment. Specifically, the biasing member 50 biases the engagement projection 28 that has been fitted into the engager recess portion 45A toward a bottom side of the engager recess portion 45A from the opposite side to the side where the engagement projection 28 is fitted. The engagement projection 28 that has been fitted into the engager recess portion 45A is thereby maintained in a state fitted into the engager recess portion 45A by the biasing force of the biasing member 50. Namely, the engagement projection 28 is maintained in an engaged state with the engaging portion 44.

Figure 8:
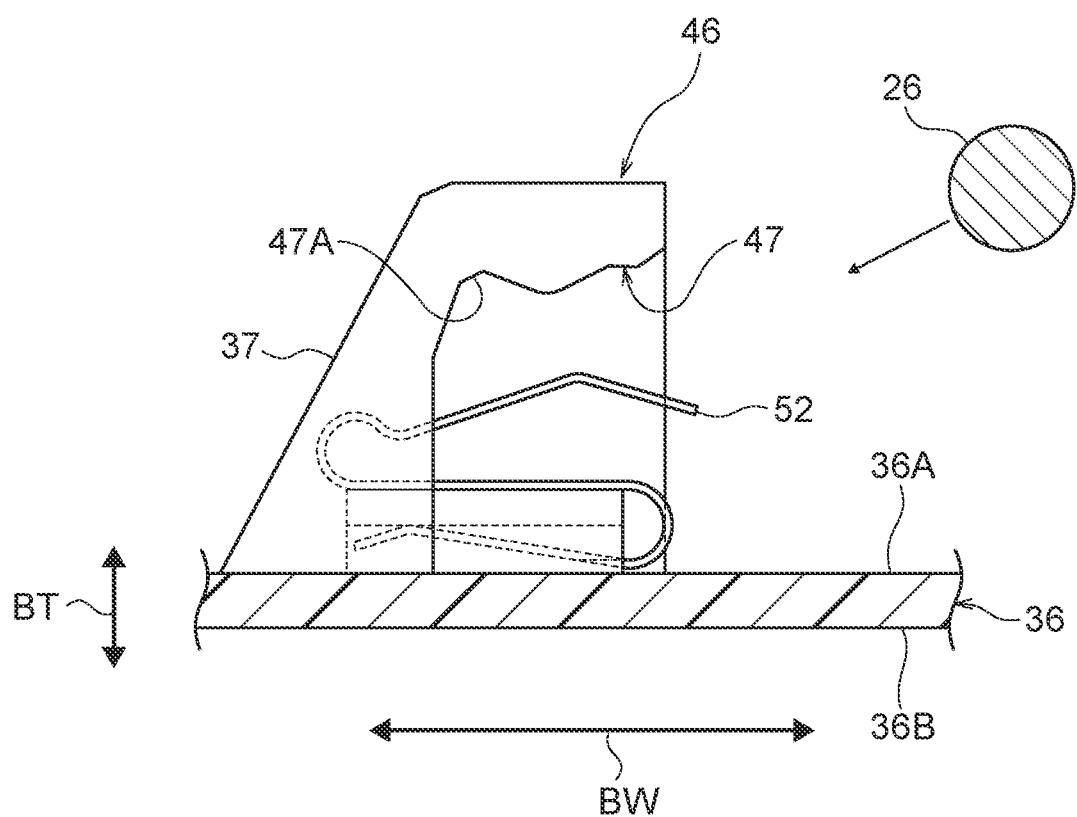
FIG. 8 is a side view of an engaging portion in the region indicated by the arrow 8 in FIG. 2, as viewed from a length direction outer side of the bracket.
Figure 9:
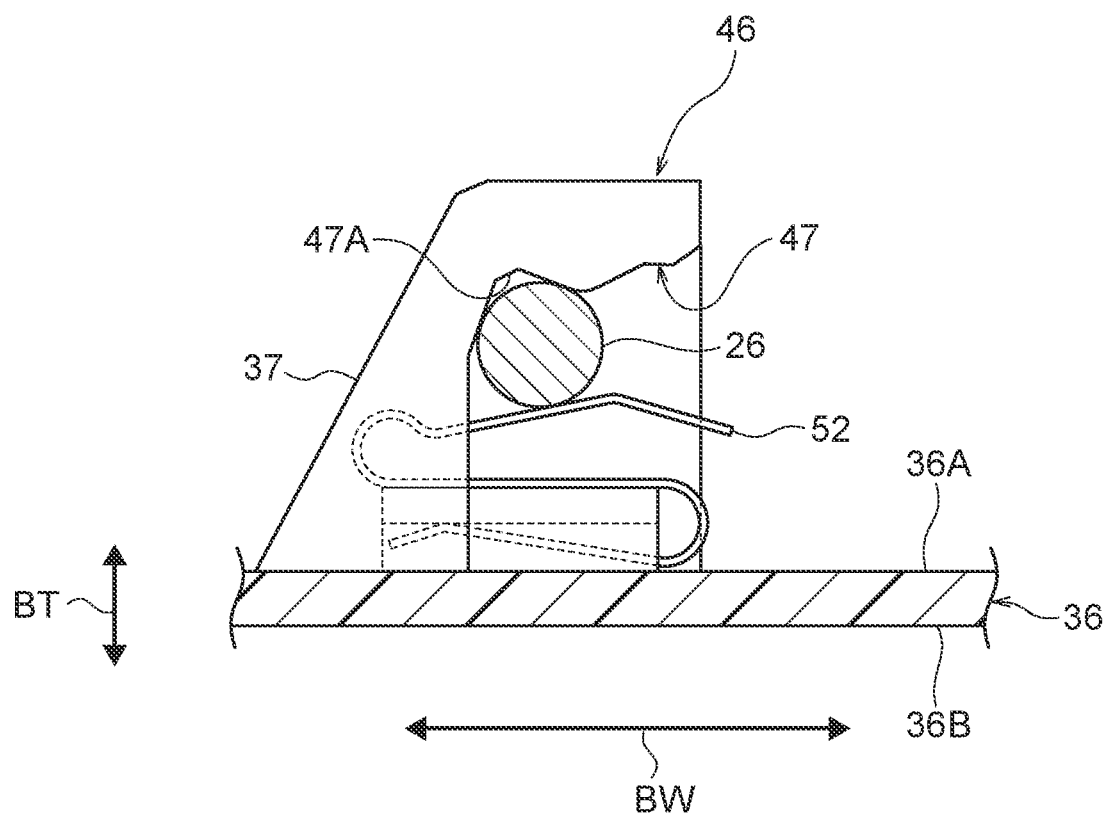
FIG. 9 is a side view illustrating a state in which another engagement projection has been fitted into the engaging portion illustrated in FIG. 8.
Figure 11:
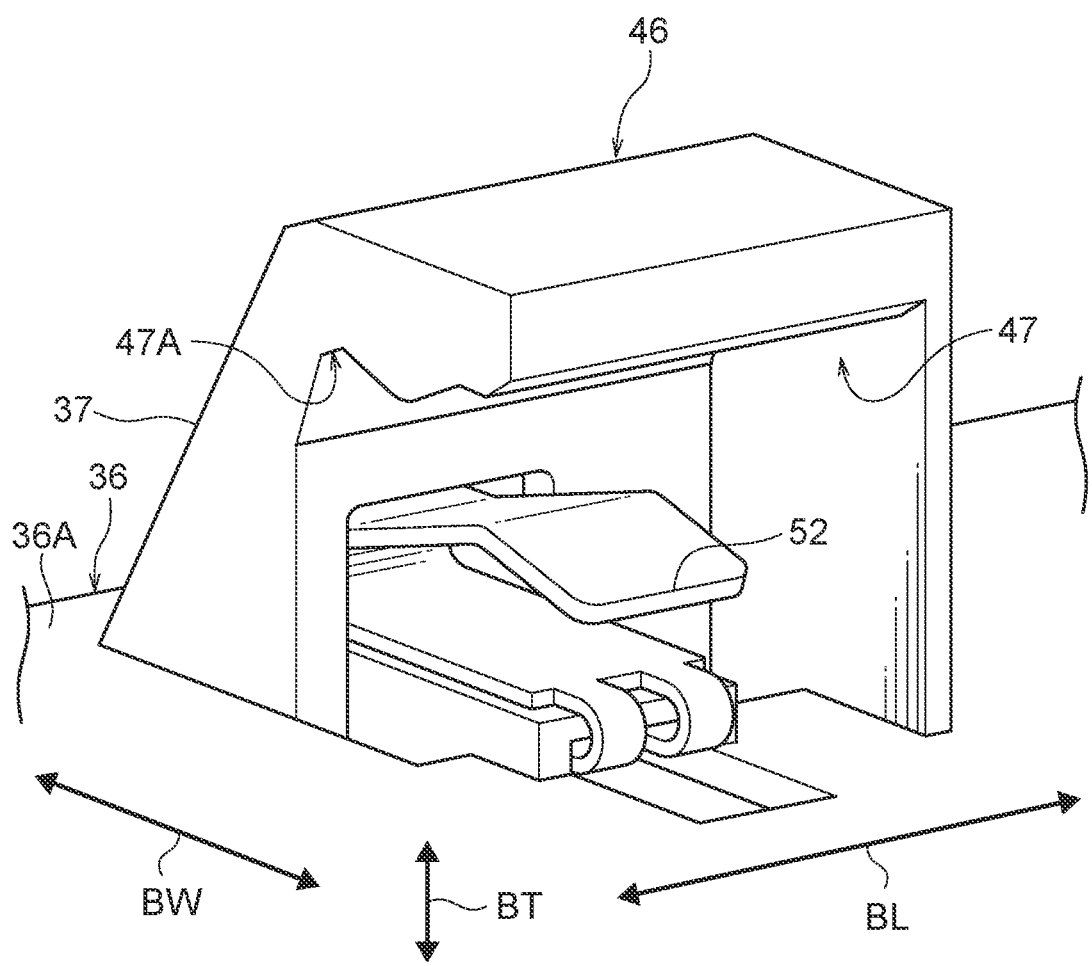
FIG. 11 is a perspective view illustrating the engaging portion illustrated in FIG. 9.
Figure 12:
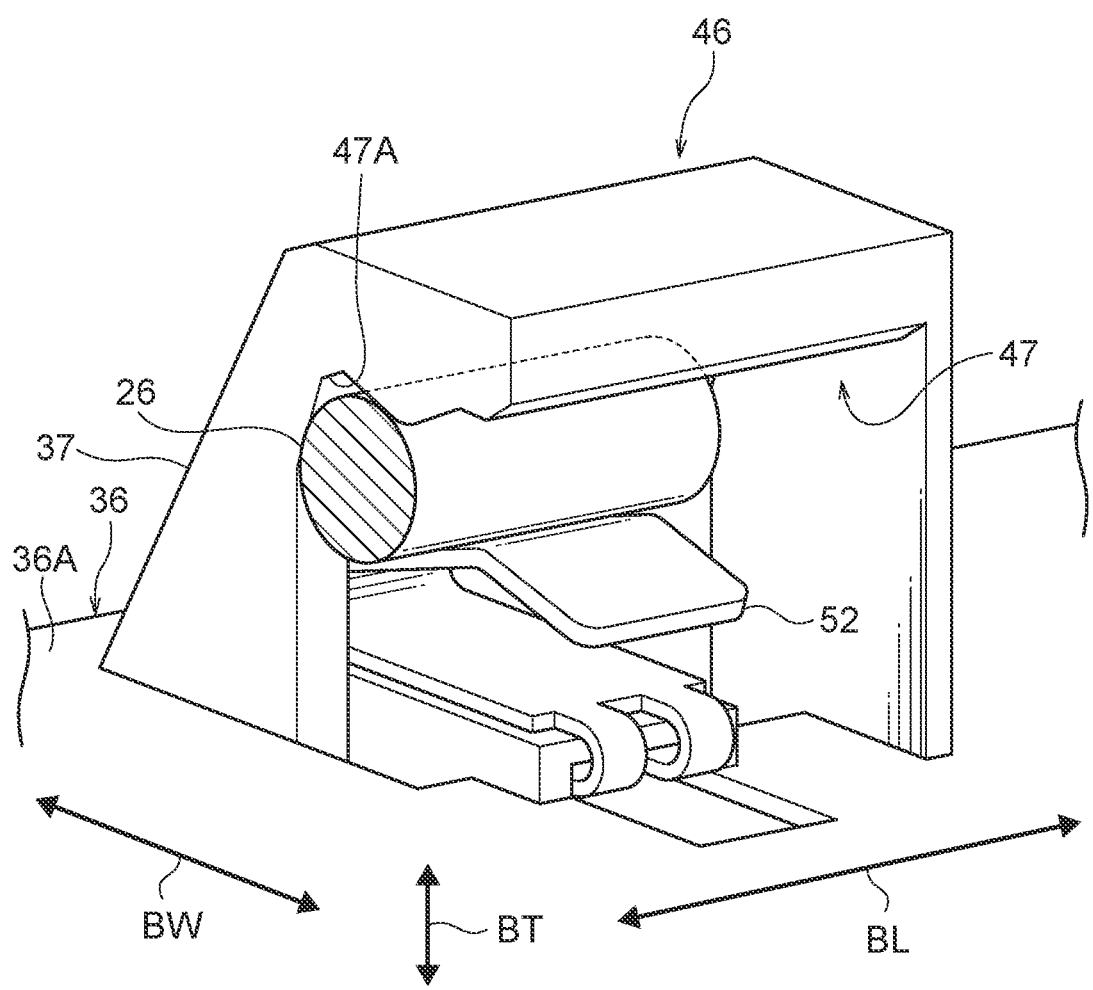
FIG. 12 is a perspective view illustrating a state in which another engagement projection has been fitted into the engaging portion illustrated in FIG. 10.

As illustrated in FIG. 8 and FIG. 11, the engaging portion 46 includes a protruding portion 37 provided at the bracket piece 36, a guide recess portion 47 provided at the protruding portion 37, and a biasing member 52 provided at the guide recess portion 47. The protruding portion 37 is a portion that protrudes from a front face 36A of the bracket piece 36, and is provided with the guide recess portion 47 that is recessed toward the one width direction BW side. A wall face on the other width direction BW side and a wall face on the length direction BL outer side of the protruding portion 37 have openings at the guide recess portion 47. During attachment of the onboard device 20 to the bracket 30, the other of the engagement projections 26 is inserted into the guide recess portion 47. An engager recess portion 47A is formed on a recess bottom side (in other words, the one width direction BW side) of the guide recess portion 47. The other engagement projection 26 is fitted into the engager recess portion 47A from a direction orthogonal to the projection direction of the engagement projection 26. The biasing member 52 is a plate shaped member that biases the other engagement projection 26 that has been fitted into the engager recess portion 47A toward the engager recess portion 47A, and a plate spring is employed therefor in the present exemplary embodiment. Specifically, the biasing member 52 biases the other engagement projection 26 that has been fitted into the engager recess portion 47A toward a bottom side of the engager recess portion 47A from the opposite side to the side where the one engagement projection 26 is fitted. The other engagement projection 26 that has been fitted into the engager recess portion 47A is thereby maintained in a state fitted into the engager recess portion 47A by the biasing force of the biasing member 52. Namely, the other engagement projection 26 is maintained in an engaged state with the engaging portion 46.

Positioning Portions

As illustrated in FIG. 2, the positioning portions 70, 72, 74 are respectively provided at the bracket pieces 32, 34, 36. The positioning portions 70, 72, 74 are locations used to position the bracket pieces 32, 34, 36 with respect to the window glass 100. Specifically, the positioning portions 70, 72, 74 are retained by a non-illustrated pressing apparatus that presses adhesion faces of the respective bracket pieces 32, 34, 36 against the window glass 100 so as to position the bracket pieces 32, 34, 36 with respect to the window glass 100.

The positioning portions 70 are protrusions that project from the front face 32A of the bracket piece 32, and plural (three in the present exemplary embodiment) of the positioning portions 70 are provided at the bracket piece 32. At least one out of these positioning portions 70 is adjacent (or in close proximity) to the engager recess portion 43A. Specifically, at least one out of these positioning portions 70 is adjacent (or in close proximity) to the protruding portion 33 provided with the engager recess portion 43A. The plural positioning portions 70 are arranged in a row along the length direction BL. In the present exemplary embodiment, configuration is made such that in a state in which the one engagement projection 26 has engaged with the engager recess portion 43A (in other words, in the fitted state), the plural positioning portions 70 are arranged in a row on an extension line L1 of the axial line of the one engagement projection 26 (see FIG. 2).

The positioning portions 72 are protrusions that project from the front face 34A of the bracket piece 34, and plural (two in the present exemplary embodiment) of the positioning portions 72 are provided at the bracket piece 34. At least one out of these positioning portions 72 is adjacent (or in close proximity) to the engager recess portion 45A. Specifically, at least one out of these positioning portions 72 is adjacent (or in close proximity) to the protruding portion 35 provided with the engager recess portion 45A. The plural positioning portions 72 are arranged in a row along the width direction BW. In the present exemplary embodiment, configuration is made such that in a state in which the engagement projection 28 has engaged with the engager recess portion 45A (in other words, in the fitted state), the plural positioning portions 72 are arranged in a row on an extension line L2 of the axial line of the engagement projection 28 (see FIG. 2).

The positioning portions 74 are protrusions that project from the front face 36A of the bracket piece 36, and plural (two in the present exemplary embodiment) of the positioning portions 74 are provided at the bracket piece 36. At least one out of these positioning portions 74 is adjacent (or in close proximity) to the engager recess portion 47A. Specifically, at least one out of these positioning portions 74 is adjacent (or in close proximity) to the protruding portion 37 provided with the engager recess portion 47A. The plural positioning portions 74 are arranged in a row along the length direction BL. In the present exemplary embodiment, configuration is made such that in a state in which the other engagement projection 26 has engaged with the engager recess portion 47A (in other words, in the fitted state), the plural positioning portions 74 are arranged in a row on an extension line L3 of the other engagement projection 26 (see FIG. 2).

Note that the row direction of the plural positioning portions 72 on the bracket piece 34 (equivalent to the width direction BW in the present exemplary embodiment) is orthogonal to the respective row directions of the plural positioning portions 70, 74 on the bracket pieces 32, 36. In the state in which the onboard device 20 has been attached to the bracket 30, the row direction of the plural positioning portions 72 on the bracket piece 34 corresponds to the vehicle front-rear direction, and the row directions of the plural positioning portions 70, 74 on the bracket pieces 32, 36 correspond to the vehicle width direction.

Next, explanation follows regarding an onboard device fixing method to fix the onboard device 20 of the present exemplary embodiment to the window glass 100.

First, the bracket 30 is fixed by adhering the bracket 30 to the window glass 100 that has been processed into a finished product. Specifically, first, the window glass 100 is retained by a first retaining section of the pressing apparatus, after which the bracket 30 is retained by a second retaining section of the pressing apparatus. Note that the second retaining section of the pressing apparatus retains the bracket 30 by retaining the positioning portions 70, 72, 74 respectively provided at the bracket pieces 32, 34, 36 configuring the bracket 30. When retained in this manner, the bracket 30 is positioned with respect to the second retaining section. Adhesive is then applied to the back faces 32B, 34B, 36B of the respective bracket pieces 32, 34, 36 configuring the bracket 30.

Next, the bracket 30 thus retained by the second retaining section is brought toward the window glass 100 retained by the first retaining section, and the respective back faces 32B, 34B, 36B of the bracket pieces 32, 34, 36 applied with the adhesive are pressed against the inner face 100A of the window glass 100. The bracket pieces 32, 34, 36 are thereby adhered to the window glass 100. Namely, the bracket pieces 32, 34, 36 are fixed by adhering the bracket pieces 32, 34, 36 to the window glass 100. Note that the first retaining section and the second retaining section of the pressing apparatus are set such that the bracket 30 is adhered to the window glass 100 at a predetermined adhesion position. The second retaining section of the pressing apparatus retains the positioning portions 70, 72, 74 in order to position the bracket 30 with respect to the window glass 100.

Note that in the present exemplary embodiment, the window glass 100 may be retained by the first retaining section after the bracket 30 has been retained by the second retaining section. Moreover, application of the adhesive to the bracket 30 may be performed prior to the bracket 30 being retained by the second retaining section.

Next, the onboard device 20 is attached to the bracket 30.

Figure 7:
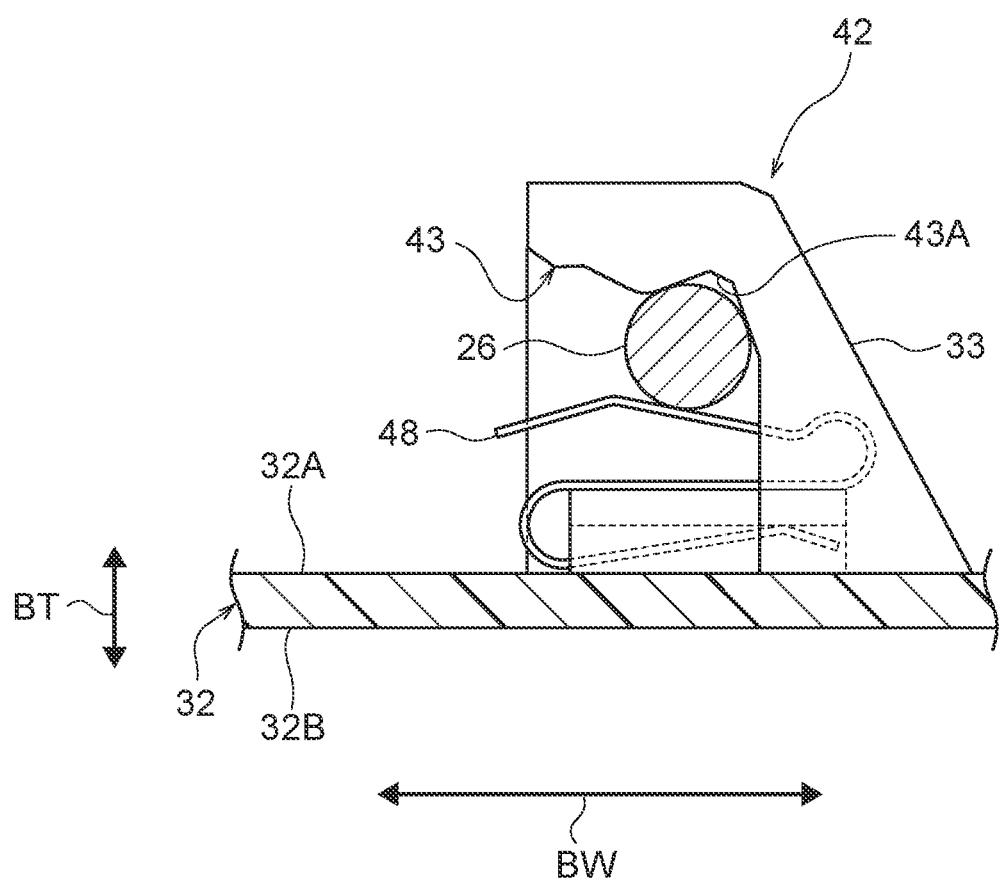
FIG. 7 is a side view illustrating the bracket illustrated in FIG. 6 in a state in which one engagement projection has been fitted into an engaging portion of the bracket.

Specifically, first, the one engagement projection 26 of the onboard device 20 is inserted into the guide recess portion 43 from the other width direction BW side as illustrated in FIG. 6, and the other engagement projection 26 is inserted into the guide recess portion 43 from the other width direction BW side as illustrated in FIG. 8. Next, the one engagement projection 26 is moved toward the recess bottom side of the guide recess portion 43, and the one engagement projection 26 is fitted into the engager recess portion 43A from a direction orthogonal to the projection direction of the engagement projection 26 (see FIG. 7). Moreover, the other engagement projection 26 is moved toward the recess bottom side of the guide recess portion 47, and the other engagement projection 26 is fitted into the engager recess portion 47A from a direction orthogonal to the projection direction of the engagement projection 26 (see FIG. 8). When the one engagement projection 26 has been fitted into the engager recess portion 43A, the one engagement projection 26 is maintained in the fitted state by the biasing force of the biasing member 48. Similarly, when the other engagement projection 26 has been fitted into the engager recess portion 47A, the other engagement projection 26 is maintained in the fitted state by the biasing force of the biasing member 52. As the pair of engagement projections 26 are being fitted into the respective engager recess portions 43A, 47A, the engagement projection 28 is similarly fitted into the engager recess portion 45A along the projection direction of the engagement projection 28 (see FIG. 10).

By attaching the onboard device 20 to the bracket 30 in this manner, the onboard device 20 is fixed to the window glass 100 through the bracket 30. Note that this attachment of the onboard device 20 to the bracket 30 may be performed after the window glass 100 has been attached to the vehicle body, or may be performed before the window glass 100 has been attached to the vehicle body. In consideration of the fact that defects and so on may arise during transportation of the onboard device 20, the onboard device 20 is preferably attached to the bracket 30 after the window glass 100 has been attached to the vehicle body. In the state in which the onboard device 20 has been attached to the bracket 30, the length direction EL of the onboard device 20 and the length direction BL of the bracket 30 are substantially aligned with the vehicle width direction, and the width direction EW of the onboard device 20 and the width direction BW of the bracket 30 are substantially aligned with a vehicle length direction. In this state, the respective lens portions 24A of the two cameras 24 of the onboard device 20 face ahead of the vehicle so as to be capable of imaging the area ahead of the vehicle.

Next, explanation follows regarding operation and advantageous effects of the present exemplary embodiment.

In the bracket 30, since the adjacent bracket pieces 32, 34 together bracket pieces are coupled together by the coupling portions 38, 40 so as to allow relative movement therebetween, even if the respective bracket pieces undergo thermal expansion accompanying an increase in the temperature of the onboard device 20, such thermal expansion of the adjacent bracket pieces 32, 34 together bracket pieces is absorbed by the coupling portions 38, 40. Since the bracket 30 includes such a configuration to absorb thermal expansion accompanying an increase in temperature, an increase in shear force acting on the adhesive between the bracket 30 and the window glass 100 due to this thermal expansion can be suppressed. This enables a reduction in adhesive strength between the bracket 30 and the window glass 100 accompanying thermal expansion to be suppressed.

Thus, the attachment structure 51 employing the bracket 30 is capable of suppressing a reduction in adhesive strength between the bracket 30 and the window glass 100 accompanying an increase in the temperature of the onboard device 20.

Moreover, the coupling portions 38, 40 of the bracket 30 include the deformable portions 39, 41 that are capable of elastic deformation, and these deformable portions 39, 41 undergo elastic deformation (specifically, in-plane deformation) so as to absorb thermal expansion of the adjacent bracket pieces 32, 34 together bracket pieces. Thus, a reduction in adhesive strength between the bracket 30 and the window glass 100 accompanying thermal expansion can be suppressed by a simple configuration in which the deformable portions 39, 41 undergo elastic deformation.

Moreover, the deformable portions 39, 41 of the bracket 30 are each configured by an arching curved portion that is capable of bending deformation, thereby enabling a localized concentration of stress to be suppressed from arising in the curved portions during bending deformation (elastic deformation) of the curved portions. The bracket 30 is thus capable of maintaining the advantageous effect of absorbing thermal expansion of the adjacent bracket pieces 32, 34 together bracket pieces in the coupling portions 38, 40 over a long period of time.

Moreover, in the bracket 30, the thickness of the deformable portion 39 and the thickness of the deformable portion 41 are both less than the thickness of the bracket piece 32. The deformable portions 39, 41 therefore undergo elastic deformation more readily than they would in cases in which, for example, the respective thicknesses of the deformable portions 39, 41 are equivalent to or greater than the thickness of the bracket piece 32. This enables the deformable portions of the bracket 30 to be made to undergo elastic deformation more readily by using a simple configuration in which the respective thicknesses of the deformable portions 39, 41 are both less than the thickness of the bracket piece 32.

Moreover, in the bracket 30, the adjacent bracket pieces of the bracket pieces are coupled together by the plural coupling portions 38, 40. This enables absorption of the thermal expansion of the adjacent bracket pieces of the bracket 30 to be spread between the plural coupling portions 38, 40, in contrast to in configurations in which, for example, adjacent bracket pieces of the bracket pieces are coupled together by a single coupling portion. This enables thermal expansion of the adjacent bracket pieces to be stably absorbed.

Moreover, in the bracket 30, the adjacent bracket pieces of the bracket pieces are coupled together by the plural coupling portions 38, 40 that have the same shape as each other, and adjacent coupling portions 38, 40 are disposed symmetrically with each other. This enables thermal expansion of the adjacent bracket pieces of the bracket 30 to be absorbed substantially uniformly by the respective coupling portions 38, 40. This enables thermal expansion of the adjacent bracket pieces to be still more stably absorbed.

Moreover, in the bracket 30, positioning of the bracket pieces 32, 34, 36 with respect to the window glass 100 is performed by retaining the respective positioning portions 70, 72, 74 provided at the bracket pieces 32, 34, 36 using the pressing apparatus. This enables positioning of the bracket pieces 32, 34, 36 with respect to the window glass 100 to be performed by retaining the positioning portions 70, 72, 74 using the pressing apparatus, without the need for processing of the window glass 100 in order to position the bracket 30. This enables the bracket 30 to be accurately positioned with respect to the window glass 100, and also facilitates a positioning operation.

Moreover, in the bracket 30, since the adjacent bracket pieces of the bracket pieces are coupled together by the coupling portions 38, 40 so as to allow relative movement therebetween, even if for example molding tolerance arises during molding of the bracket pieces, such molding tolerance of the adjacent bracket pieces can be absorbed by the coupling portions 38, 40. Since the bracket 30 is configured so as to absorb molding tolerance arising during molding, the bracket pieces 32, 34, 36 can be accurately positioned with respect to the window glass 100.

This enables the onboard device 20 in the attachment structure 51 employing the bracket 30 to be accurately positioned with respect to the window glass 100. Moreover, fixing the onboard device 20 to the window glass 100 through the bracket 30 enables the number of tasks to be reduced.

In the bracket 30, the plural positioning portions 70 are provided at the bracket piece 32, and at least one of these positioning portions 70 is adjacent (or in close proximity) to the protruding portion 33 provided with the engager recess portion 43A. Moreover, the plural positioning portions 72 are provided at the bracket piece 34, and at least one of these positioning portions 72 is adjacent (or in close proximity) to the protruding portion 35 provided with the engager recess portion 45A. Furthermore, the plural positioning portions 74 are provided at the bracket piece 36, and at least one of these positioning portions 74 is adjacent (or in close proximity) to the protruding portion 37 provided with the engager recess portion 47A. Since the protruding portions 33, 35, 37 of the bracket 30 are provided adjacent (or in close proximity) to the positioning portions 70, 72, 74 employed as positioning references by the pressing apparatus, the positions of the engager recess portions 43A, 45A, 47A with respect to the window glass 100 can be accurately determined. Namely, the bracket 30 is accurately positioned with respect to the window glass 100. This enables the positioning accuracy of the onboard device 20 attached to the bracket 30 with respect to the window glass 100 to be improved as a result.

In the bracket 30, the plural positioning portions 70 of the bracket piece 32 are arranged in a row, the plural positioning portions 72 of the bracket piece 34 are arranged in a row, and the plural positioning portions 74 of the bracket piece 36 are arranged in a row. Moreover, the row direction of the plural positioning portions 72 of the bracket piece 34 is orthogonal to the respective row directions of the plural positioning portions 70, 74 of the bracket pieces 32, 36. This improves the in-plane direction positioning accuracy with respect to the window glass 100 when adhering the respective bracket pieces 32, 34, 36 to the window glass 100.

In the state in which the onboard device 20 has been attached to the bracket 30, the plural positioning portions 70 of the bracket piece 32 are arranged in a row on the extension line L1 of the axial line of the one engagement projection 26 that projects from the onboard device 20, the plural positioning portions 72 of the bracket piece 34 are arranged in a row on the extension line L2 of the axial line of the engagement projection 28 that projects from the onboard device 20, and the plural positioning portions 74 of the bracket piece 36 are arranged in a row on the extension line L3 of the axial line of the other engagement projection 26 that projects from the onboard device 20. This further improves the positioning accuracy of the onboard device 20 with respect to the window glass 100 through the bracket 30.

Moreover, the positioning portions 70, 72, 74 of the bracket 30 are configured by protrusions provided at the faces (front faces) of the bracket pieces on the opposite side to the adhesion side. This enables placement (i.e. layout) of the adhesive applied to the adhesion-side faces (back faces) of the bracket pieces to be freely set. This thereby enables the adhesive strength between the window glass 100 and the bracket pieces 32, 34, 36 to be improved.

In the stereo camera configuring the onboard device 20 employed for driving assistance by imaging the area ahead of the vehicle, the two cameras 24 are disposed at discrete locations in the length direction EL. When fixing such a stereo camera to the front glass configuring the window glass 100, the stereo camera needs to be fixed with respect to the front glass such that the length direction EL is aligned with the vehicle width direction (in other words, such that the two cameras 24 are spaced apart from each other in the vehicle width direction). Note that in the attachment structure S 1, the plural bracket pieces 32, 34, 36 are adhered to the front glass in a state in which the plural bracket pieces 32, 34, 36 are arrayed along the vehicle width direction. This enables thermal expansion of adjacent bracket pieces in the vehicle width direction to be better absorbed by the coupling portions 38, 40 than in configurations in which, for example, plural bracket pieces are adhered to the front glass in a state in which the plural bracket pieces are arrayed along the vehicle front-rear direction. Thus, vehicle width direction positioning accuracy of the stereo camera with respect to the front glass when fixed to the front glass through the bracket 30 is improved.

In the state in which the onboard device 20 of the attachment structure 51 has been attached to the bracket 30 adhered to the front glass configuring the window glass 100, the row direction of the plural positioning portions 70 of the bracket piece 32 and the row direction of the plural positioning portions 74 of the bracket piece 36 are aligned with the vehicle width direction, and the row direction of the plural positioning portions 72 of the bracket piece 34 is aligned with the vehicle front-rear direction. This enables the vehicle width direction and the vehicle front-rear direction positioning accuracy of the attachment structure 51 with respect to the front glass to be improved when the plural bracket pieces 32, 34, 36 are respectively adhered to the front glass. The vehicle width direction and vehicle front-rear direction positioning accuracy of the bracket 30 with respect to the front glass are thereby improved.

Other Exemplary Embodiments

Figure 15:
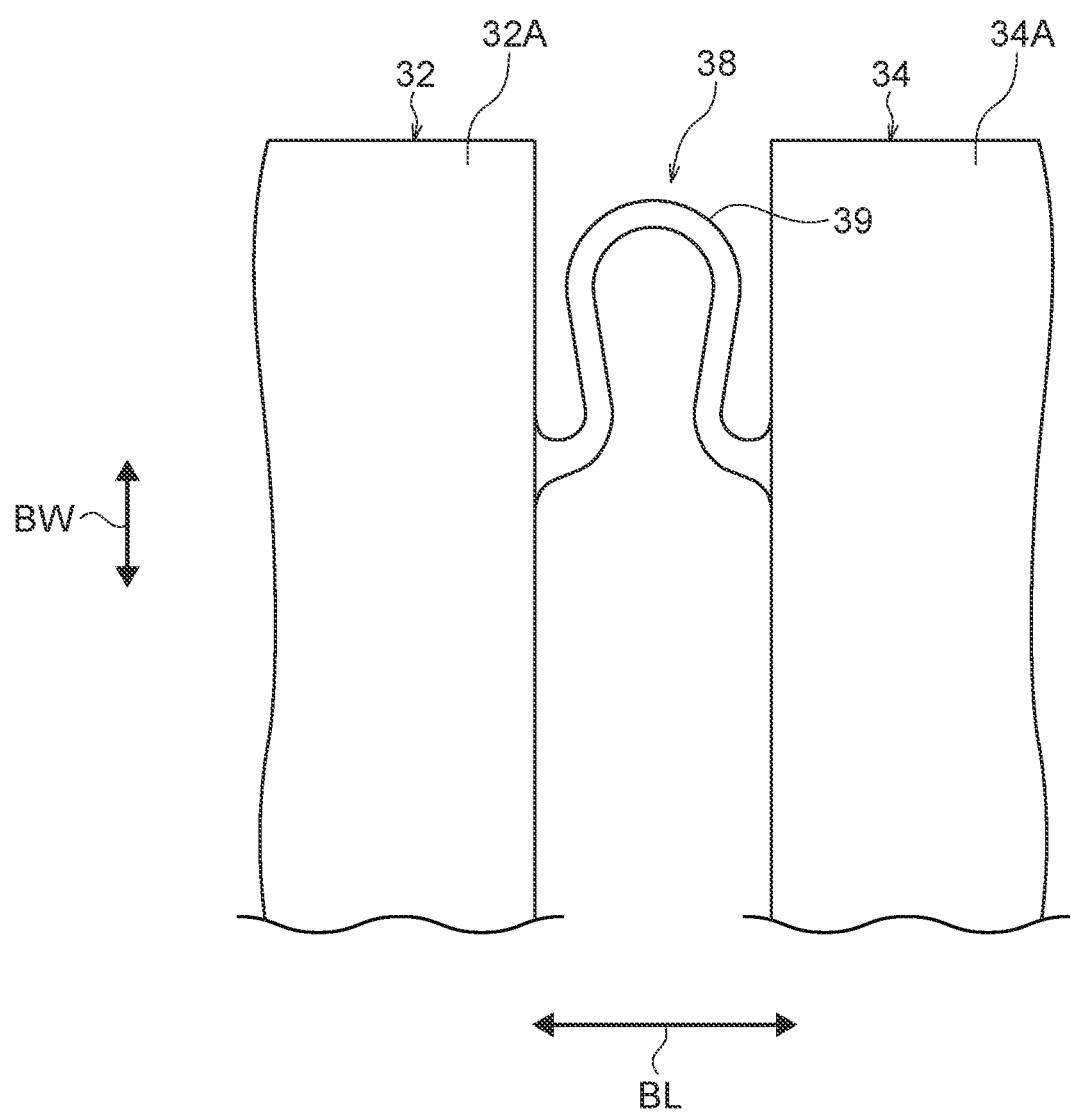
FIG. 15 is a plan view illustrating a first modified example of a coupling portion of the present disclosure.
Figure 16:
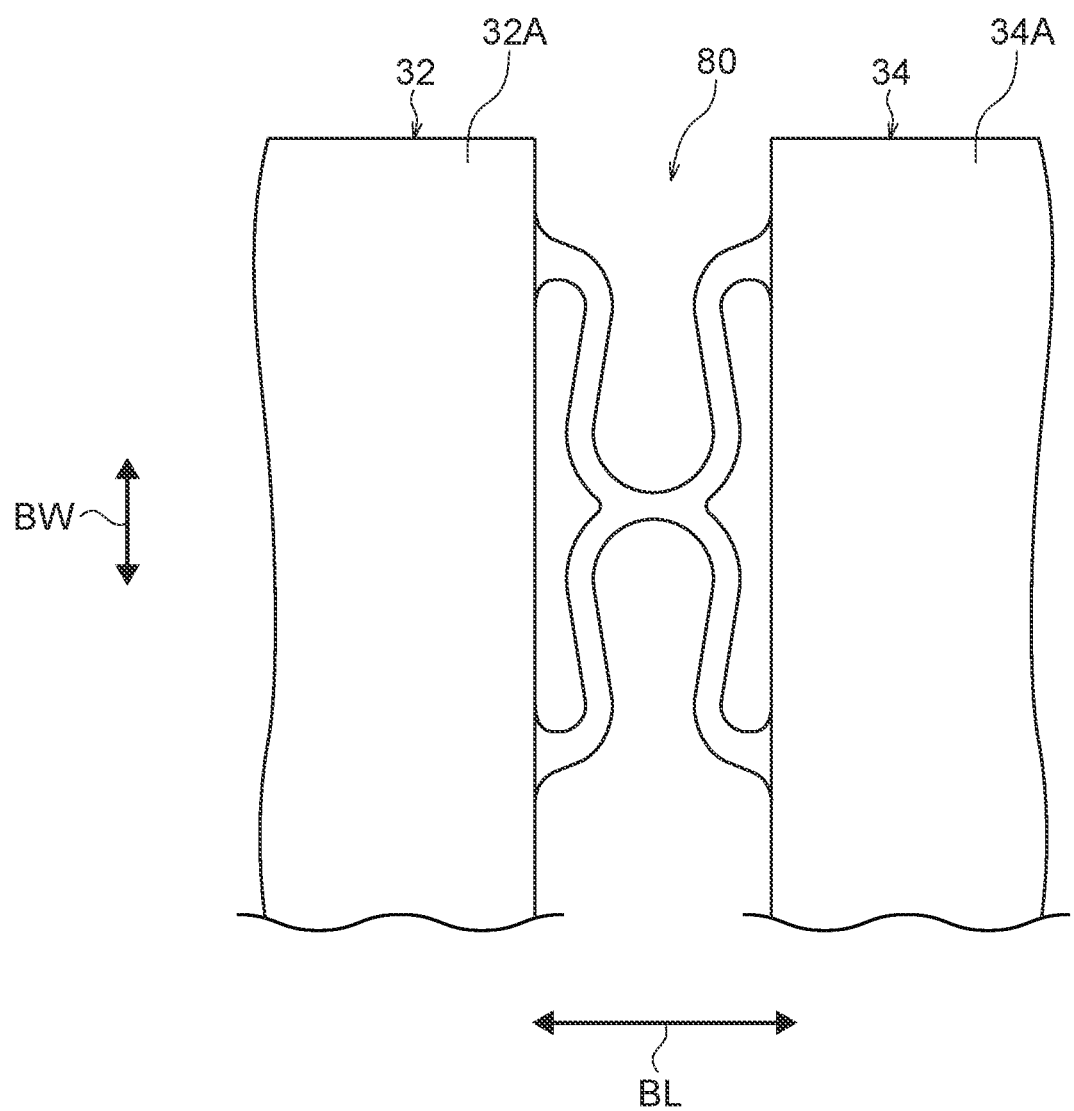
FIG. 16 is a plan view illustrating a second modified example of a coupling portion of the present disclosure.

Although adjacent bracket pieces of the bracket pieces are coupled together by the coupling portion 38 and the coupling portion 40 in the exemplary embodiment described above, the present disclosure is not limited to this configuration, and adjacent bracket pieces of the bracket piece may be coupled together by a single coupling portion. For example, as illustrated in the modified example illustrated in FIG. 15, adjacent bracket pieces of the bracket piece may be coupled together by just the coupling portion 38. Alternatively, as illustrated in the modified example illustrated in FIG. 16, apex portions of coupling portions forming mutually opposing arches may be linked together to form a single coupling portion 80 that couples together adjacent bracket pieces of the bracket piece. Adjacent bracket pieces of the bracket piece may also be coupled together by three or more coupling portions.

Figure 17:
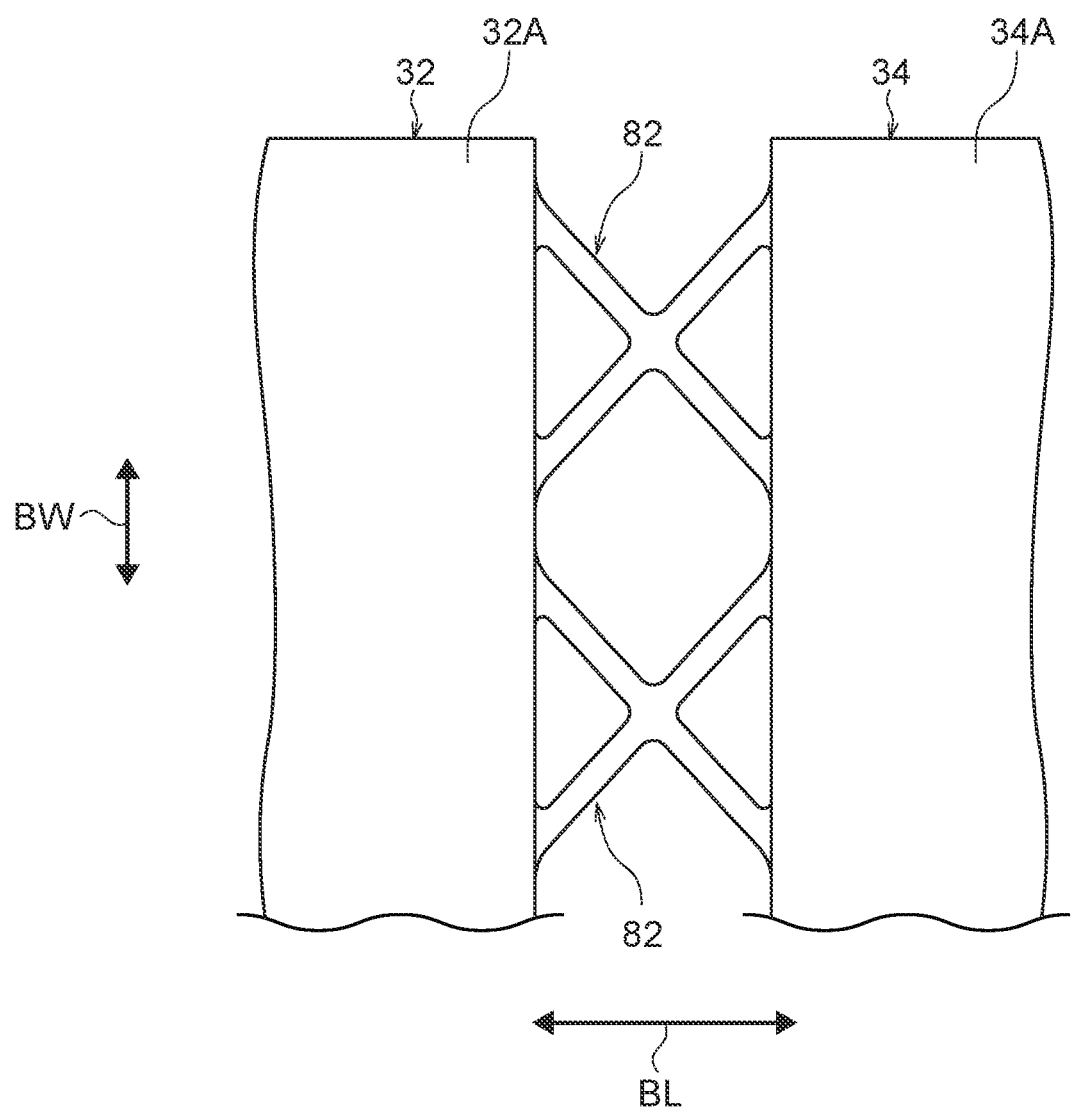
FIG. 17 is a plan view illustrating a third modified example of coupling portions of the present disclosure.
Figure 18:
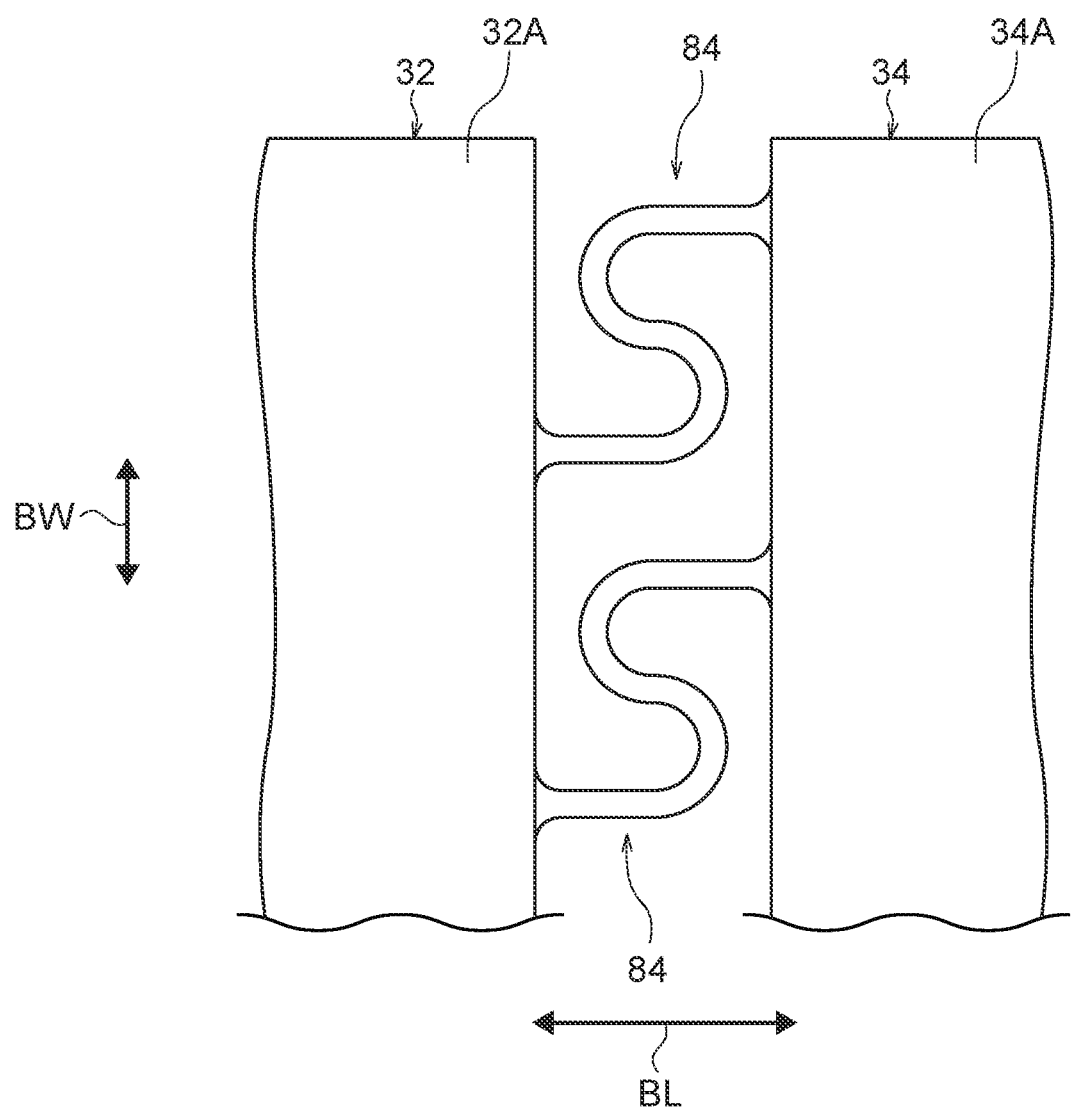
FIG. 18 is a plan view illustrating a fourth modified example of coupling portions of the present disclosure.

Although the coupling portions 38 and the coupling portions 40 each have an arched shape in the exemplary embodiment described above, the present disclosure is not limited to this configuration. For example, as illustrated in the modified example illustrated in FIG. 17, X-shaped coupling portions 82 may be employed. Alternatively, as illustrated in the modified example illustrated in FIG. 18, substantially S-shaped coupling portions 84 may be employed. Namely, as long as a coupling portion of the present disclosure is capable of coupling together adjacent bracket pieces of the bracket piece so as to allow relative movement therebetween, there is no particular limitation to the shape thereof.

Figure 19A:
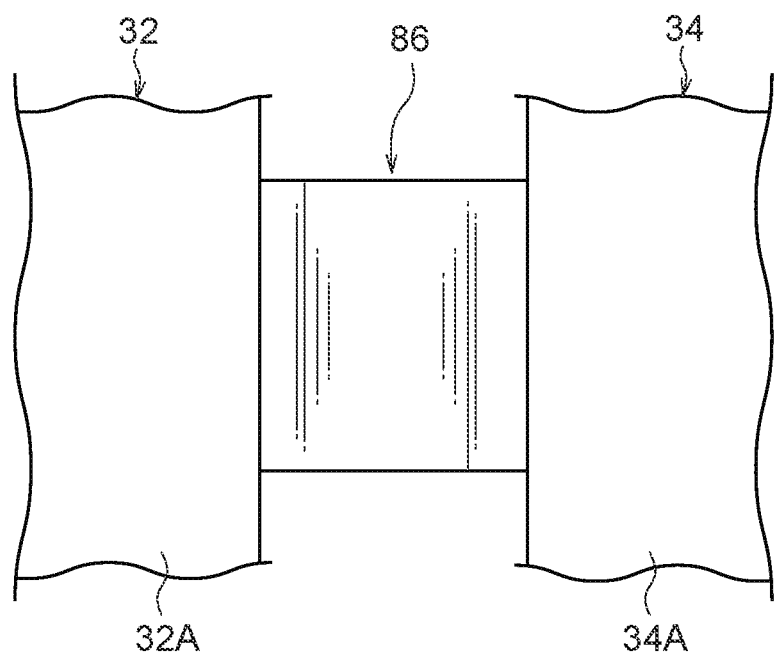
FIG. 19A is a plan view illustrating a fifth modified example of a coupling portion of the present disclosure.
Figure 19B:
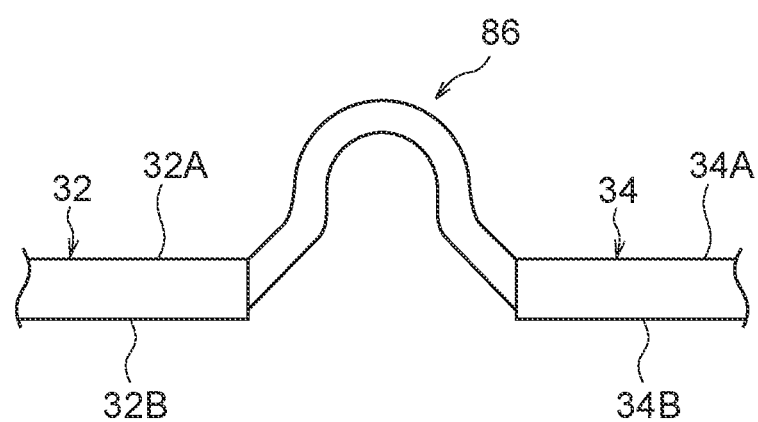
FIG. 19B is a side view illustrating the coupling portion illustrated in FIG. 19A, as viewed from a width direction of the bracket.

Although the coupling portions 38 and the coupling portions 40 are configured to undergo elastic deformation in an in-plane direction (i.e. in-plane deformation) as a result of thermal expansion of the bracket pieces in the exemplary embodiment described above, the present disclosure is not limited to this configuration. For example, as illustrated in the modified example illustrated in FIG. 19A and FIG. 19B, a coupling portion 86 configured to undergo elastic deformation in an out-of-plane direction (i.e. out-of-plane deformation) may be employed. The coupling portion 86 includes a curved portion that bulges in a bracket thickness direction, and this curved portion curves accompanying thermal expansion of the bracket pieces, thereby enabling the thermal expansion to be absorbed.

Although the coupling portions that couple together the adjacent bracket pieces 32, 34 and the coupling portions that couple together the adjacent bracket pieces 34, 36 are configured by coupling portions with the same configuration as each other in the exemplary embodiment described above, the present disclosure is not limited to this configuration. Namely, the coupling portions that couple together the adjacent bracket pieces 32, 34 and the coupling portions that couple together the adjacent bracket pieces 34, 36 may be coupling portions with different configurations to each other.

Although in the exemplary embodiment described above the adjacent bracket pieces of the bracket piece are coupled together so as to allow relative movement therebetween by the coupling portions 38, each including the deformable portion 39 that is capable of elastic deformation, and the coupling portions 40, each including the deformable portion 41 that is capable of elastic deformation, the present disclosure is not limited to this configuration. For example, the coupling portions 38 and the coupling portions 40 may each be configured including a sliding mechanism, such that the adjacent bracket pieces of the bracket piece are capable of relative movement with respect to each other using the respective sliding mechanisms of the coupling portions 38 and the coupling portions 40.

Although the bracket 30 is adhered to the front glass configuring an example of the window glass 100 in the exemplary embodiment described above, the present disclosure is not limited to this configuration. For example, the bracket 30 may be adhered to rear glass configuring an example of the window glass 100. In such cases, the stereo camera configuring the onboard device 20 images rearward from the vehicle. Besides the front glass and the rear glass, the window glass 100 to which the bracket 30 is adhered may be any window glass that is fixed with respect to the vehicle body (in other words, window glass that cannot be opened or closed). In such cases, the stereo camera configuring the onboard device 20 images outward from the vehicle through the window glass.

Although the bracket 30 is configured of the three bracket pieces 32, 34, 36 in the exemplary embodiment described above, the present disclosure is not limited to this configuration. For example, a bracket may be configured of two bracket pieces, or a bracket may be configured of four or more bracket pieces.

Although the protruding positioning portions 70, 72, 74 are respectively provided at the bracket pieces 32, 34, 36 in the exemplary embodiment described above, the present disclosure is not limited to this configuration. Alternatively, recessed positioning portions 70, 72, 74 may be respectively provided at the bracket pieces 32, 34, 36.

Although the positioning portions 70, 72, 74 are respectively provided at the plural bracket pieces 32, 34, 36 in the exemplary embodiment described above, the present disclosure is not limited to this configuration. It is sufficient that a positioning portion be provided at at least one bracket piece out of the plural bracket pieces. Note that positioning pins employed for bracket attachment may provided at the inner face 100A of the window glass 100. In such cases, forming positioning holes for these positioning pins in the bracket 30 would allow formation of the positioning portions 70, 72, 74 to the bracket pieces 32, 34, 36 to be omitted.

Although an exemplary embodiment of the present disclosure has been described above, the present disclosure is not limited to the above description, and obviously various other modifications may be implemented within a range not departing from the spirit of the present disclosure.

What is claimed is:

1. An elongated plate-shaped resin bracket for fixing an onboard device to a window glass employed in a vehicle, the bracket comprising:
   a plurality of bracket pieces, each configured to be adhered to the window glass;
   a coupling portion configured to couple together adjacent bracket pieces of the bracket pieces so as to allow relative movement therebetween; and
   an engaging portion provided at each of the bracket pieces so as to enable a plurality of engagement portions provided at the onboard device to engage with the respective engaging portions, wherein:

the adjacent bracket pieces and the coupling portion are molded together as an integral unit,
the coupling portion extends from one to another of the bracket pieces, as viewed from a thickness direction of the bracket, and
an extension direction central portion of the coupling portion is a curved portion that is curved so as to arch toward a width direction of the bracket and capable of elastic deformation.

2. The bracket of claim 1, wherein a thickness of the curved portion that is capable of elastic deformation is smaller than a thickness of the bracket pieces.

3. The bracket of claim 1, wherein adjacent bracket pieces of the bracket pieces are coupled together by a plurality of the coupling portions.

4. The bracket of claim 2, wherein adjacent bracket pieces of the bracket pieces are coupled together by a plurality of the coupling portions.

5. The bracket of claim 1, wherein:
adjacent bracket pieces of the bracket pieces are coupled together by a plurality of the coupling portions, which have the same shape as each other; and
adjacent coupling portions of the coupling portions are disposed symmetrically with each other.

6. The bracket of claim 2, wherein:
adjacent bracket pieces of the bracket pieces are coupled together by a plurality of the coupling portions, which have the same shape as each other; and
adjacent coupling portions of the coupling portions are disposed symmetrically with each other.

7. An onboard device attachment structure, comprising:
an elongated plate-shaped resin bracket for fixing an onboard device to a window glass employed in a vehicle, the bracket including:
a plurality of bracket pieces, each configured to be adhered to the window glass;
a coupling portion configured to couple together adjacent bracket pieces of the bracket pieces so as to allow relative movement therebetween; and
an engaging portion provided at each of the bracket pieces so as to enable a plurality of engagement portions provided at the onboard device to engage with the respective engaging portions, and the bracket being adhered to the window glass; and
an onboard device that is provided with an engagement portion configured to engage with the engaging portion of the bracket, and that is attachable to the bracket, wherein:
the coupling portion extends from one to another of the bracket pieces, as viewed from a thickness direction of the bracket, and
an extension direction central portion of the coupling portion is a curved portion that is curved so as to arch toward a width direction of the bracket and capable of elastic deformation.

8. The onboard device attachment structure of claim 7, wherein:
the onboard device comprises a stereo camera configured to image an area ahead of the vehicle;
the plurality of bracket pieces included in the bracket are adhered to the front glass of the vehicle in a state arrayed along a vehicle width direction; and
a plurality of the engagement portions provided at the stereo camera are configured to engage with the engaging portions provided at the respective bracket pieces.

* * * * *